(12) United States Patent
Stuber et al.

(10) Patent No.: US 11,825,555 B2
(45) Date of Patent: *Nov. 21, 2023

(54) SYSTEMS AND METHODS FOR REAL-TIME REMOTE CONTROL OF MOBILE APPLICATIONS

(71) Applicant: LIVEPERSON, INC., New York, NY (US)

(72) Inventors: Reto Stuber, Karlsruhe (DE); Christian Thum, Mannheim (DE); Stefan Seedorf, Mannheim (DE); Yossi Levin, Ein Vered (IL)

(73) Assignee: LIVEPERSON, INC., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/740,793

(22) Filed: May 10, 2022

(65) Prior Publication Data

US 2022/0360976 A1   Nov. 10, 2022

Related U.S. Application Data

(63) Continuation of application No. 16/993,520, filed on Aug. 14, 2020, now Pat. No. 11,363,452, which is a
(Continued)

(51) Int. Cl.
*H04W 8/24* (2009.01)
*G06F 9/451* (2018.01)
*H04M 1/72403* (2021.01)

(52) U.S. Cl.
CPC ............ *H04W 8/245* (2013.01); *G06F 9/452* (2018.02); *H04M 1/72403* (2021.01); *H04W 8/24* (2013.01)

(58) Field of Classification Search
CPC ......... H04W 8/24; H04W 8/245; H04W 8/22; H04W 40/02; H04W 76/10; H04W 76/02;
(Continued)

(56) References Cited

U.S. PATENT DOCUMENTS 4,107,443 A    8/1978  Mark et al.
8,447,820 B1   5/2013  Gay
(Continued)

FOREIGN PATENT DOCUMENTS

CN       102143235         8/2011
CN       104394191         3/2015
WO       2018/034989 A1    2/2018

OTHER PUBLICATIONS

International Search Report and Written Opinion dated Nov. 7, 2017 for PCT Application No. PCT/US2017/046550, 16 pages.
(Continued)

*Primary Examiner* — Jean A Gelin
(74) *Attorney, Agent, or Firm* — POLSINELLI LLP

(57) ABSTRACT

Systems and methods for real-time, remote-control of mobile applications are provided. A communication session between a network device and a terminal device can be established. The network device can be configured to execute a mobile application. For example, the mobile application can include an input element at an initial state. The mobile application can be remotely controlled by the terminal device. Further, a data stream including content data can be received and transmitted during the communication session. For example, the content data can include an object presented by the mobile application. The content data can be displayed on the terminal device. An input event associated with the content data can be detected. Control data can be generated based on the detected input event. The
(Continued)

control data can be received at the network device and the initial state of the input element can be modified.

36 Claims, 14 Drawing Sheets

Related U.S. Application Data continuation of application No. 16/353,321, filed on Mar. 14, 2019, now Pat. No. 10,785,641, which is a continuation of application No. 15/675,443, filed on Aug. 11, 2017, now Pat. No. 10,278,065.

(60) Provisional application No. 62/374,892, filed on Aug. 14, 2016.

(58) Field of Classification Search
CPC ....... H04W 8/26; H04M 3/562; H04M 3/563; H04M 3/58; H04L 51/32; H04L 67/22; H04L 65/4015; H04L 67/308
See application file for complete search history.

(56) References Cited

U.S. PATENT DOCUMENTS

| | | | |
|---|---|---|---|
| 10,278,065 B2 | 4/2019 | Stuber et al. | |
| 10,606,367 B2 | 3/2020 | Wisnia | |
| 10,785,641 B2 | 9/2020 | Stuber et al. | |
| 11,363,452 B2 | 6/2022 | Stuber et al. | |
| 2005/0267928 A1* | 12/2005 | Anderson | ............... H04L 41/28 709/200 |
| 2009/0028047 A1 | 1/2009 | Schmidt | |
| 2009/0192845 A1 | 7/2009 | Gudipaty | |
| 2011/0004888 A1 | 1/2011 | Srinivasan et al. | |
| 2011/0010629 A1 | 1/2011 | Castro | |
| 2013/0013683 A1 | 1/2013 | Elliott | |
| 2013/0250354 A1 | 9/2013 | Kato | |
| 2013/0275531 A1 | 10/2013 | Hah | |
| 2014/0240440 A1 | 8/2014 | Seo | |
| 2014/0289423 A1* | 9/2014 | Kim | .................... H04L 47/2416 709/233 |
| 2014/0331138 A1 | 11/2014 | Overton et al. | |
| 2015/0035938 A1 | 2/2015 | Emori | |
| 2015/0082345 A1 | 3/2015 | Archer | |
| 2015/0101003 A1 | 4/2015 | Bull | |
| 2016/0198509 A1 | 7/2016 | Hayes, Jr. | |
| 2016/0292324 A1* | 10/2016 | Leonard | ............. G06Q 30/0202 |
| 2017/0185365 A1 | 6/2017 | Sugaya | |
| 2017/0230505 A1 | 8/2017 | McCarthy-Howe | |
| 2018/0049023 A1 | 2/2018 | Stuber et al. | |
| 2019/0342749 A1 | 11/2019 | Stuber et al. | |

OTHER PUBLICATIONS

Non-Final Office Action dated Apr. 4, 2018 for U.S. Appl. No. 15/675,443; 8 pages.

Notice of Allowance dated Dec. 17, 2018 for U.S. Appl. No. 15/675,443; 8 pages.

Non-Final Office Action dated Aug. 7, 2019 for U.S. Appl. No. 16/353,321; 10 pages.

Final Office Action dated Nov. 4, 2019 for U.S. Appl. No. 16/353,321; 14 pages.

Notice of Allowance dated May 14, 2020 for U.S. Appl. No. 16/353,321; 9 pages.

Non-Final Office Action dated Oct. 14, 2021 for U.S. Appl. No. 16/993,520; 12 pages.

Notice of Allowance dated Feb. 11, 2022 for U.S. Appl. No. 16/993,520; 7 pages.

* cited by examiner

SYSTEMS AND METHODS FOR REAL-TIME REMOTE CONTROL OF MOBILE APPLICATIONS

CROSS-REFERENCE TO RELATED APPLICATIONS

This application is a continuation of U.S. patent application Ser. No. 16/993,520 filed Aug. 14, 2020 which is a continuation of U.S. patent application Ser. No. 16/353,321 filed Mar. 14, 2019 which is a continuation of U.S. patent application Ser. No. 15/675,443 filed Aug. 11, 2017, which claims the benefit of U.S. Provisional Application No. 62/374,892 filed Aug. 14, 2016, each of which are incorporated herein by reference in their entirety for all purposes.

FIELD

The present disclosure relates generally to facilitating real-time communication sessions between customers and agents. More specifically, techniques are provided to remotely control mobile applications during the communication sessions.

BACKGROUND

The use of digital messaging as a means of communication is widespread. Further, mobile applications are increasingly incorporating messaging functionality. However, messaging functionality can be limited. For example, whenever customers face issues with mobile applications, messaging functionality alone may not be sufficient to adequately address the issues due to lack of shared visual context.

SUMMARY

In some embodiments, a computer-implemented method is provided. The computer-implemented method may include establishing, at a communication server, a communication session between a network device and a terminal device. The network device can be configured to execute a mobile application. For example, the mobile application can include an input element at an initial state. In some instances, the mobile application can be remotely controlled by the terminal device. Further, the method can include receiving a data stream during the communication session. The data stream can include content data. For example, the content data can include an object presented by the mobile application. The object can correspond to the input element. The method can include transmitting the data stream during the communication session. The data stream can be received at the terminal device. The content data can be displayed on the terminal device. The method can also include detecting an input event associated with the content data. Control data can be generated based on the detected input event. The control data can then be transmitted. The control data can be received at the network device. For example, the control data can modify the initial state of the input element included in the mobile application.

In some embodiments, another computer-implemented method is provided. The computer-implemented method can include identifying, at a network device, an input element associated with a mobile application. The input element can be configured to receive input data based on an interaction. The method can include determining an input boundary corresponding to the input element. For example, the input boundary can be an area for receiving the input data. Further, the method can include executing the mobile application. Executing the mobile application can include displaying the input element at an initial state. The mobile application can be remotely controlled by a terminal device. The method can also include receiving input corresponding to a selection at the terminal device. The selection can be associated with selection data, and the selection data can be used to identify a position associated with the mobile application. The method can include determining whether the selection data corresponds to the input element. Determining whether the selection data corresponds to the input element can include comparing the selection data with the input boundary. Further, the method can include determining an action associated with the input element when the selection data corresponds to the input element. The action can then be performed.

In some embodiments, another computer-implemented method is provided. The computer-implemented method can include executing, at a network device, a mobile application that includes an input element at an initial state. The mobile application can be remotely controlled by a terminal device. The method can also include generating a data stream. The data stream can include content data, which can include an object presented by the mobile application. For example, the object can correspond to the input element. The method can include transmitting the data stream. The data stream can be received at the terminal device. The content data can be displayed at the terminal device. Further, the method can include receiving control data associated with the object, determining whether the control data corresponds to the input element, and modifying the initial state of the input element when the control data corresponds to the input element. Modifying the initial state of the input element can include changing the initial state to a subsequent state.

Embodiments of the present disclosure may also include a system. The system may include one or more processors, and a non-transitory computer-readable storage medium containing instructions which, when executed on the one or more data processors, cause the one or more data processors to perform operations including any of the computer-implemented methods described above and herein.

Embodiments of the present disclosure may also include a computer-program product tangibly embodied in a non-transitory machine-readable storage medium, including instructions configured to cause a data processing apparatus to perform operations including any of the computer-implemented methods described above and herein.

BRIEF DESCRIPTION OF THE DRAWINGS

The present disclosure is described in conjunction with the appended figures.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred examples of embodiment(s) only and is not intended to limit the scope, applicability or configuration of the disclosure. Rather, the ensuing description of the preferred examples of embodiment(s) will provide those skilled in the art with an enabling description for implementing a preferred examples of embodiment. It is understood that various changes can be made in the function and arrangement of elements without departing from the spirit and scope as set forth in the appended claims.

Figure 1:
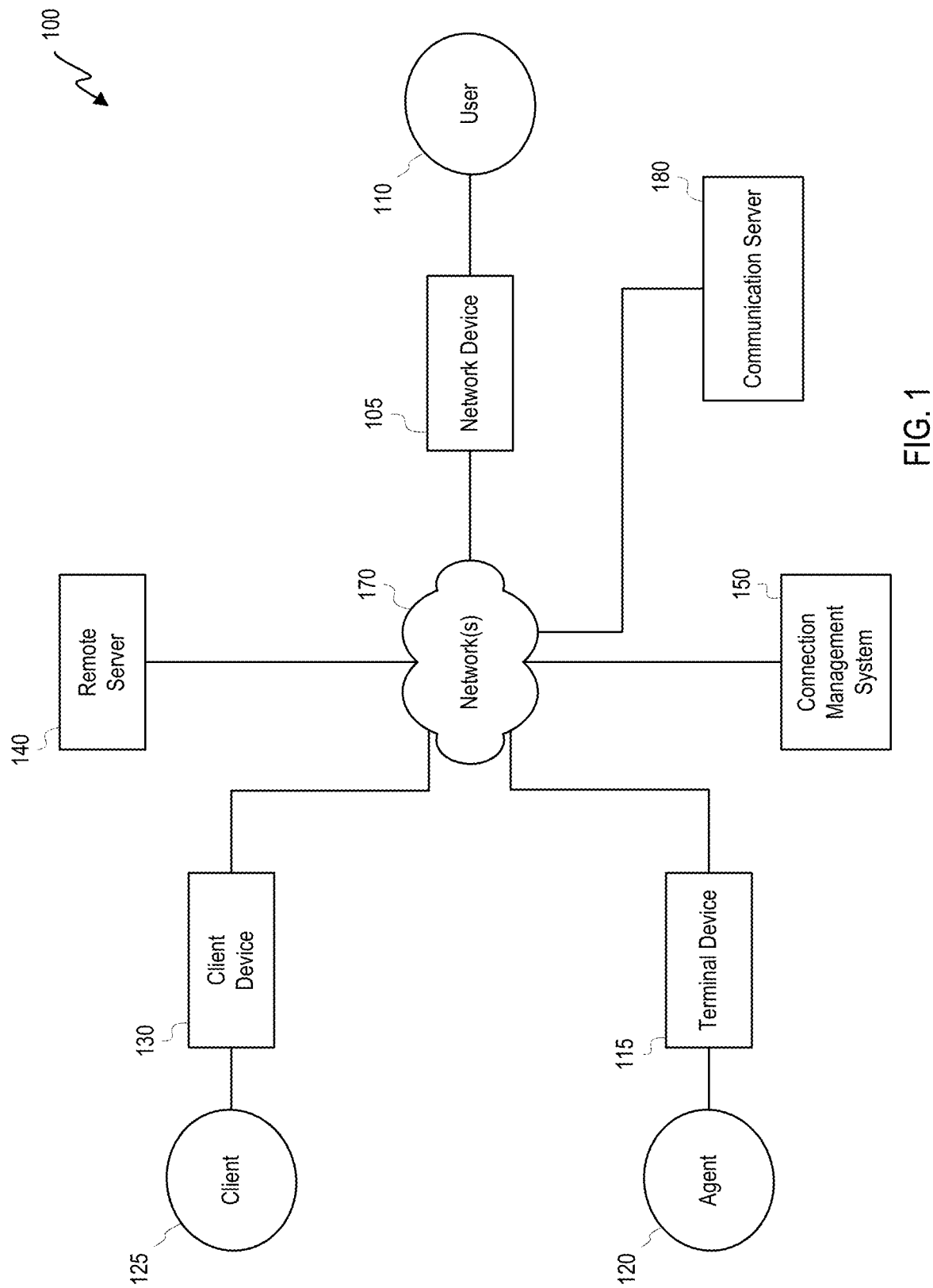
FIG. 1 shows a block diagram of an embodiment of a network interaction system.

FIG. 1 shows a block diagram of an embodiment of a network interaction system 100 which implements and supports certain embodiments and features described herein. Certain embodiments relate to establishing a connection channel between a network device 105 (which can be operated by a user 110) and a terminal device 115 (which can be operated by an agent 120). In certain embodiments, the network interaction system 100 can include a client device 130 associated with a client 125.

In certain embodiments, a user 110 can be an individual browsing a web site or accessing an online service provided by a remote server 140. A client 125 can be an entity that provides, operates, or runs the web site or the online service, or individuals employed by or assigned by such an entity to perform the tasks available to a client 125 as described herein. The agent 120 can be an individual, such as a support agent or sales associate tasked with providing support or information to the user 110 regarding the website or online service (e.g., information about products available at an online store). Out of a large number of agents, a subset of agents may be appropriate for providing support or information for a particular client 125. The agent 120 may be affiliated or not affiliated with the client 125. Each agent can be associated with one or more clients 125. In some non-limiting examples, a user 110 can be an individual shopping an online store from a personal computing device, a client 125 can be a company that sells products online, and an agent 120 can be a sales associate employed by the company. In various embodiments, the user 110, client 125, and agent 120 can be other individuals or entities.

While FIG. 1 shows only a single network device 105, terminal device 115 and client device 130, an interaction system 100 can include multiple or many (e.g., tens, hundreds or thousands) of each of one or more of these types of devices. Similarly, while FIG. 1 shows only a single user 110, agent 120 and client 125, an interaction system 100 can include multiple or many of each of one or more of such entities. Thus, it may be necessary to determine which terminal device is to be selected to communicate with a given network device. Further complicating matters, a remote server 140 may also be configured to receive and respond to select network-device communications.

A connection management system 150 can facilitate strategic routing of communications. A communication can include a message with content (e.g., defined based on input from an entity, such as typed or spoken input). The communication can also include additional data, such as data about a transmitting device (e.g., an IP address, account identifier, device type and/or operating system); a destination address; an identifier of a client; an identifier of a webpage or webpage element (e.g., a webpage or webpage element being visited when the communication was generated or otherwise associated with the communication) or online history data; a time (e.g., time of day and/or date); and/or destination address. Other information can be included in the communication. In some instances, connection management system 150 routes the entire communication to another device. In some instances, connection management system 150 modifies the communication or generates a new communication (e.g., based on the initial communication). The new or modified communication can include the message (or processed version thereof), at least some (or all) of the additional data (e.g., about the transmitting device, webpage or online history and/or time) and/or other data identified by connection management system 150 (e.g., account data associated with a particular account identifier or device). The new or modified communication can include other information as well.

Part of strategic-routing facilitation can include establishing, updating and using one or more connection channels between network device 105 and one or more terminal devices 115. For example, upon receiving a communication from network device 105, connection management system 150 can first estimate to which client (if any) the communication corresponds. Upon identifying a client, connection management system 150 can identify a terminal device 115 associated with the client for communication with network device 105. In some instances, the identification can include evaluating a profile of each of a plurality of agents (or experts or delegates), each agent (e.g., agent 120) in the plurality of agents being associated with a terminal device (e.g., terminal device 115). The evaluation can relate to a content in a network-device message. The identification of the terminal device 115 can include a technique described, for example, in U.S. application Ser. No. 12/725,799, filed on Mar. 17, 2010, which is hereby incorporated by reference in its entirety for all purposes.

In some instances, connection management system 150 can determine whether any connection channels are established between network device 105 and a terminal device associated with the client (or remote server 140) and, if so, whether such channel is to be used to exchange a series of communications including the communication.

Upon selecting a terminal device 115 to communicate with network device 105, connection management system 150 can establish a connection channel between the network device 105 and terminal device 115. In some instances, connection management system 150 can transmit a message to the selected terminal device 115. The message may request an acceptance of a proposed assignment to communicate with a network device 105 or identify that such an assignment has been generated. The message can include information about network device 105 (e.g., IP address, device type, and/or operating system), information about an associated user 110 (e.g., language spoken, duration of having interacted with client, skill level, sentiment, and/or topic preferences), a received communication, code (e.g., a clickable hyperlink) for generating and transmitting a communication to the network device 105, and/or an instruction to generate and transmit a communication to network device 105.

In one instance, communications between network device 105 and terminal device 115 can be routed through connection management system 150. Such a configuration can allow connection management system 150 to monitor the communication exchange and to detect issues (e.g., as defined based on rules) such as non-responsiveness of either device or extended latency. Further, such a configuration can facilitate selective or complete storage of communications, which may later be used, for example, to assess a quality of a communication exchange and/or to support learning to update or generate routing rules so as to promote particular post-communication targets.

In some embodiments, connection management system 150 can monitor the communication exchange in real-time and perform automated actions (e.g., rule-based actions) based on the live communications. For example, when connection management system 150 determines that a communication relates to a particular product, connection management system 150 can automatically transmit an additional message to terminal device 115 containing additional information about the product (e.g., quantity of products in stock, links to support documents related to the product, or other information about the product or similar products).

In one instance, a designated terminal device 115 can communicate with network device 105 without relaying communications through connection management system 150. One or both devices 105, 115 may (or may not) report particular communication metrics or content to connection management system 150 to facilitate communication monitoring and/or data storage.

As mentioned, connection management system 150 may route select communications to a remote server 140. Remote server 140 can be configured to provide information in a predetermined manner. For example, remote server 140 may access defined one or more text passages, voice recording and/or files to transmit in response to a communication. Remote server 140 may select a particular text passage, recording or file based on, for example, an analysis of a received communication (e.g., a semantic or mapping analysis).

Routing and/or other determinations or processing performed at connection management system 150 can be performed based on rules and/or data at least partly defined by or provided by one or more client devices 130. For example, client device 130 may transmit a communication that identifies a prioritization of agents, terminal-device types, and/or topic/skill matching. As another example, client device 130 may identify one or more weights to apply to various variables potentially impacting routing determinations (e.g., language compatibility, predicted response time, device type and capabilities, and/or terminal-device load balancing). It will be appreciated that which terminal devices and/or agents are to be associated with a client may be dynamic. Communications from client device 130 and/or terminal devices 115 may provide information indicating that a given terminal device and/or agent is to be added or removed as one associated with a client. For example, client device 130 can transmit a communication with IP address and an indication as to whether a terminal device with the address is to be added or removed from a list identifying client-associated terminal devices.

Each communication (e.g., between devices, between a device and connection management system 150, between remote server 140 and connection management system 150 or between remote server 140 and a device) can occur over one or more networks 170. Any combination of open or closed networks can be included in the one or more networks 170. Examples of suitable networks include the Internet, a personal area network, a local area network (LAN), a wide area network (WAN), or a wireless local area network (WLAN). Other networks may be suitable as well. The one or more networks 170 can be incorporated entirely within or can include an intranet, an extranet, or a combination thereof. In some instances, a network in the one or more networks 170 includes a short-range communication channel, such as a Bluetooth or a Bluetooth Low Energy channel. In one embodiment, communications between two or more systems and/or devices can be achieved by a secure communications protocol, such as secure sockets layer (SSL) or transport layer security (TLS). In addition, data and/or transactional details may be encrypted based on any convenient, known, or to be developed manner, such as, but not limited to, Data Encryption Standard (DES), Triple DES, Rivest-Shamir-Adleman encryption (RSA), Blowfish encryption, Advanced Encryption Standard (AES), CAST-128, CAST-256, Decorrelated Fast Cipher (DFC), Tiny Encryption Algorithm (TEA), eXtended TEA (XTEA), Corrected Block TEA (XXTEA), and/or RC5, etc.

A network device 105, terminal device 115 and/or client device 130 can include, for example, a portable electronic device (e.g., a smart phone, tablet, laptop computer, or smart wearable device) or a non-portable electronic device (e.g., one or more desktop computers, smart appliances, servers, and/or processors). Connection management system 150 can be separately housed from network, terminal and client devices or may be part of one or more such devices (e.g., via installation of an application on a device). Remote server 140 may be separately housed from each device and connection management system 150 and/or may be part of another device or system. While each device, server and system in FIG. 1 is shown as a single device, it will be appreciated that multiple devices may instead be used. For example, a set of network devices can be used to transmit various communications from a single user, or remote server 140 may include a server stack.

Communication server 180 can include one or more servers that are configured to establish a communication session between network device 105 and terminal device 115. Further, communication server 180 can be the same as communication server 710 described in FIG. 7 herein. Further, communication server 180 can be the server through which network device 105 and terminal device 115 exchange data in real-time (e.g., messages, media streams, screenshots, event data, and the like) during a communication session. In some instances, any of communication server 180, network device 105, and terminal device 115 can perform, at least in part, each of processes 800 through 1200. In some instances, connection management system 150 can also perform at least part of each of processes 800 through 1200.

A software agent or application may be installed on and/or executable on a depicted device, system or server. In one instance, the software agent or application is configured such that various depicted elements can act in complementary manners. For example, a software agent on a device can be configured to collect and transmit data about device usage to a separate connection management system, and a software application on the separate connection management system can be configured to receive and process the data.

Figure 2:
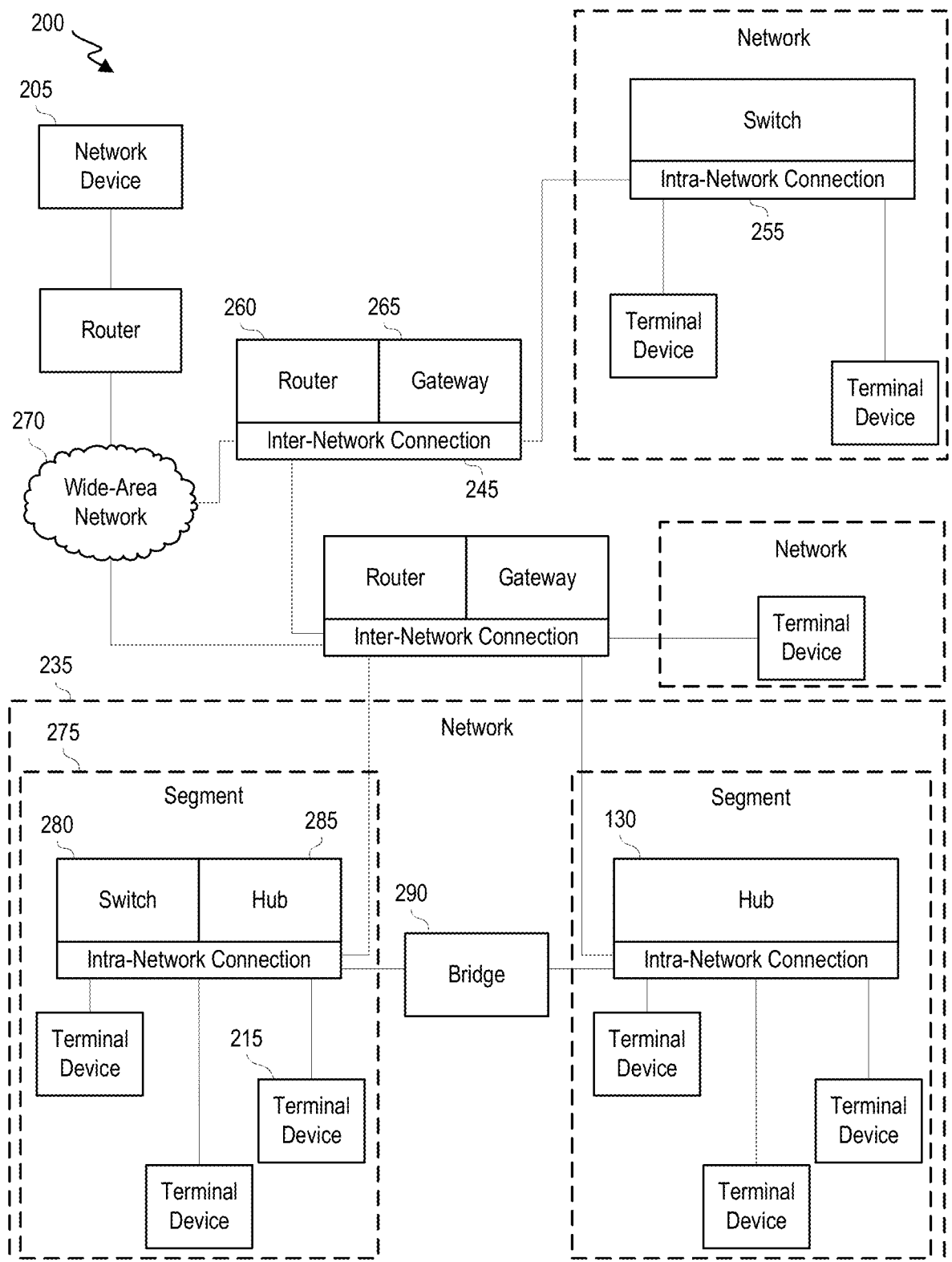
FIG. 2 shows a block diagram of another embodiment of a network interaction system.

FIG. 2 shows a block diagram of another embodiment of a network interaction system 200. Generally, FIG. 2 illustrates a variety of components configured and arranged to enable a network device 205 to communicate with one or more terminal devices 215. The depicted instance includes nine terminal devices 215 included in three local-area networks 235.

In some instances, a communication from network device 205 includes destination data (e.g., a destination IP address) that at least partly or entirely indicates which terminal device is to receive the communication. Network interaction system 200 can include one or more inter-network connection components 240 and/or one or more intra-network connection components 255 that can process the destination data and facilitate appropriate routing.

Each inter-network connection components 245 can be connected to a plurality of networks 235 and can have multiple network cards installed (e.g., each card connected to a different network). For example, an inter-network connection component 245 can be connected to a wide-area network 270 (e.g., the Internet) and one or more local-area networks 235. In the depicted instance, in order for a communication to be transmitted from network device 205 to any of the terminal devices, in the depicted system, the communication must be handled by multiple inter-network connection components 245.

When an inter-network connection component 245 receives a communication (or a set of packets corresponding to the communication), inter-network connection component 245 can determine at least part of a route to pass the communication to a network associated with a destination. The route can be determined using, for example, a routing table (e.g., stored at the router), which can include one or more routes that are pre-defined, generated based on an incoming message (e.g., from another router or from another device) or learned.

Examples of inter-network connection components 245 include a router 260 and a gateway 265. An inter-network connection component 245 (e.g., gateway 265) may be configured to convert between network systems or protocols. For example, gateway 265 may facilitate communication between Transmission Control Protocol/Internet Protocol (TCP/IP) and Internetwork Packet Exchange/Sequenced Packet Exchange (IPX/SPX) devices.

Upon receiving a communication at a local-area network 235, further routing may still need to be performed. Such intra-network routing can be performed via an intra-network connection component 255, such as a switch 280 or hub 285. Each intra-network connection component 255 can be connected to (e.g., wirelessly or wired, such as via an Ethernet cable) multiple terminal devices 215. Hub 285 can be configured to repeat all received communications to each device to which it is connected. Each terminal device can then evaluate each communication to determine whether the terminal device is the destination device or whether the communication is to be ignored. Switch 280 can be configured to selectively direct communications to only the destination terminal device.

In some instances, a local-area network 235 can be divided into multiple segments, each of which can be associated with independent firewalls, security rules and network protocols. An intra-network connection component 255 can be provided in each of one, more or all segments to facilitate intra-segment routing. A bridge 280 can be configured to route communications across segments 275.

To appropriately route communications across or within networks, various components analyze destination data in the communications. For example, such data can indicate which network a communication is to be routed to, which device within a network a communication is to be routed to or which communications a terminal device is to process (versus ignore). However, in some instances, it is not immediately apparent which terminal device (or even which network) is to participate in a communication from a network device.

To illustrate, a set of terminal devices may be configured so as to provide similar types of responsive communications. Thus, it may be expected that a query in a communication from a network device may be responded to in similar manners regardless to which network device the communication is routed. While this assumption may be true at a high level, various details pertaining to terminal devices can give rise to particular routings being advantageous as compared to others. For example, terminal devices in the set may differ from each other with respect to (for example) which communication channels are supported, geographic and/or network proximity to a network device and/or characteristics of associated agents (e.g., knowledge bases, experience, languages spoken, availability, general personality or sentiment, etc.). Accordingly, select routings may facilitate faster responses that more accurately and/or completely respond to a network-device communication. A complication is that static routings mapping network devices to terminal devices may fail to account for variations in communication topics, channel types, agent availability, and so on.

Figure 3A:
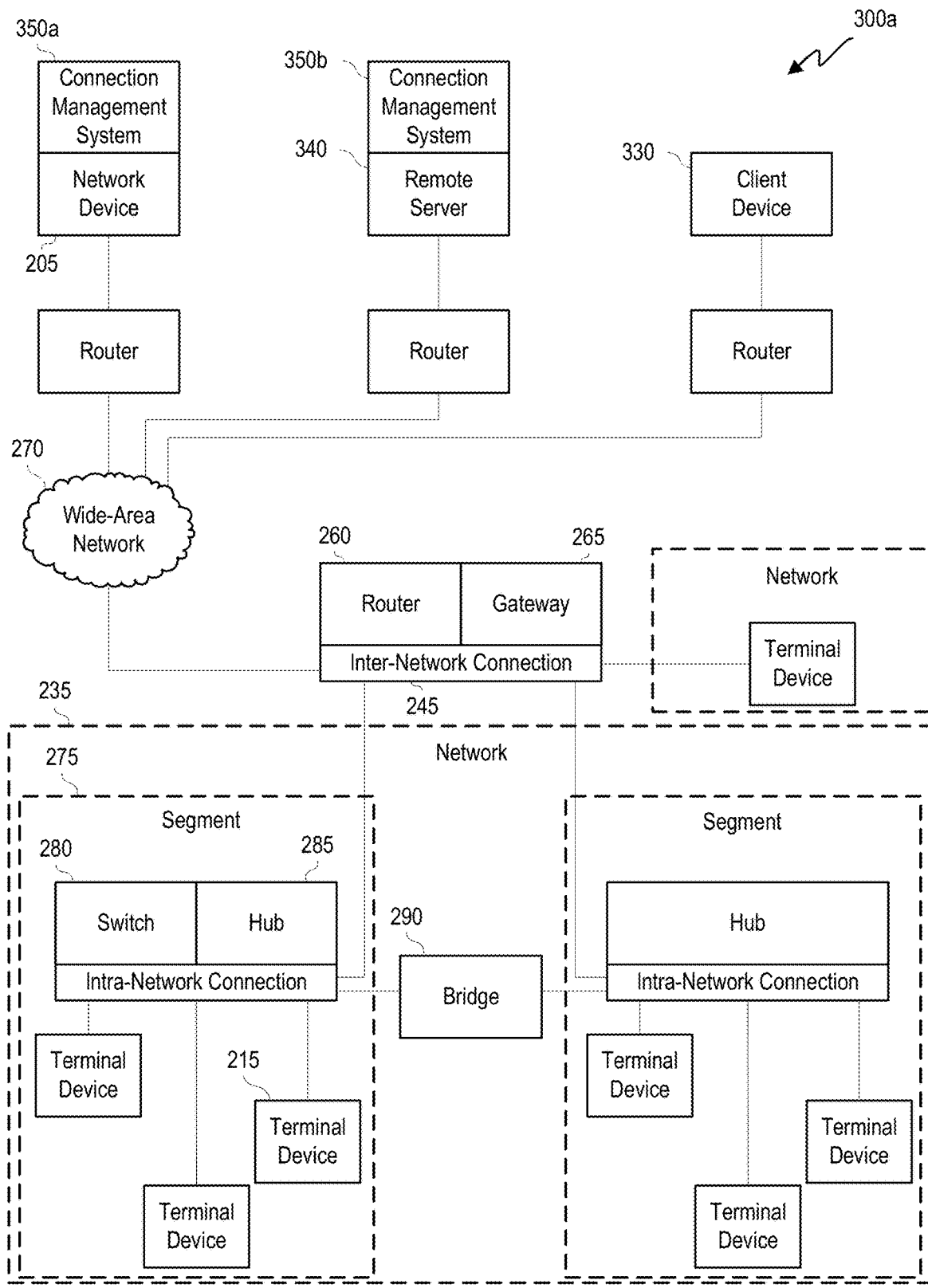
FIGS. 3A-3C show block diagrams of other embodiments of a network interaction system that includes a connection management system.
Figure 3B:
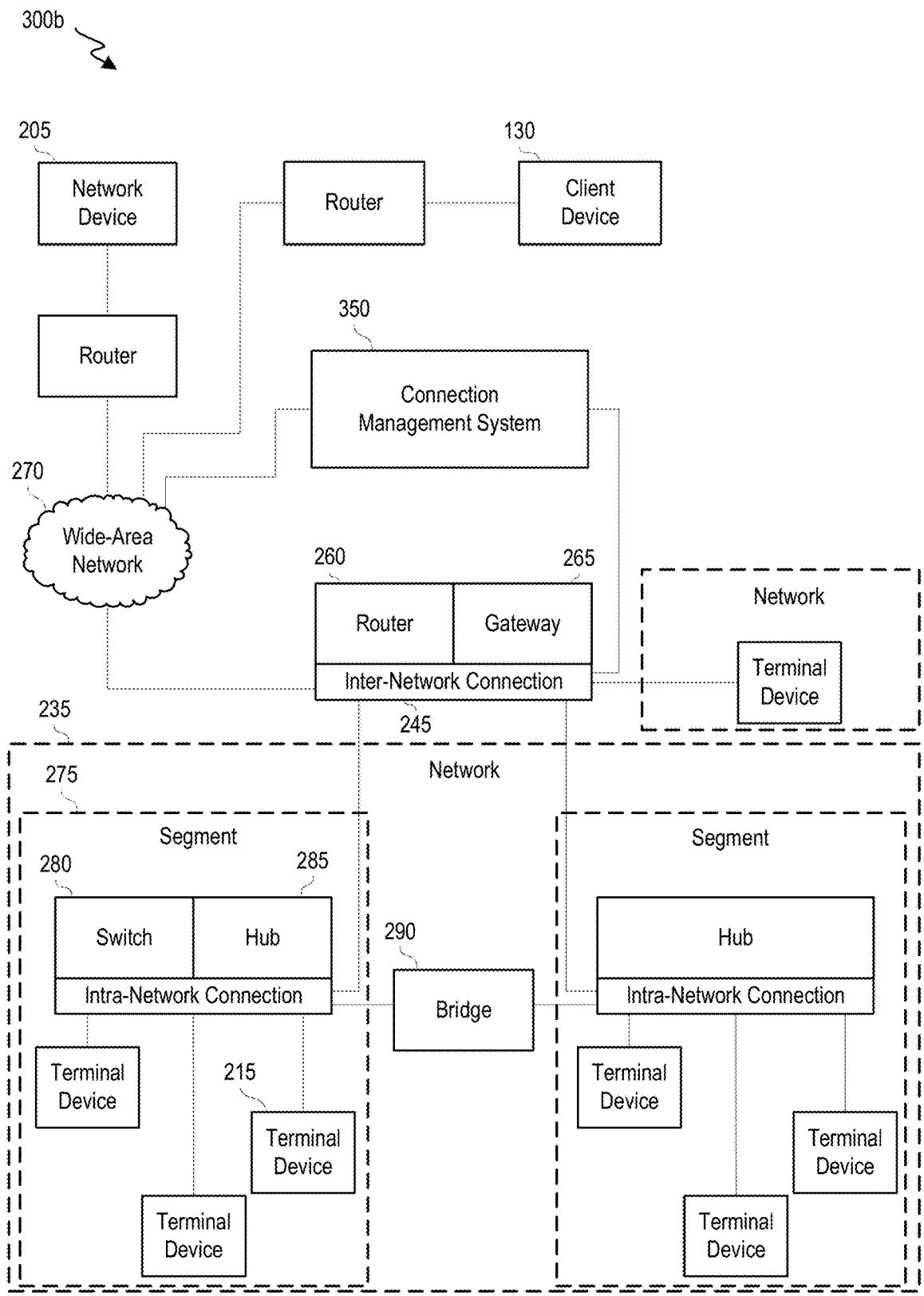
Figure 3C:
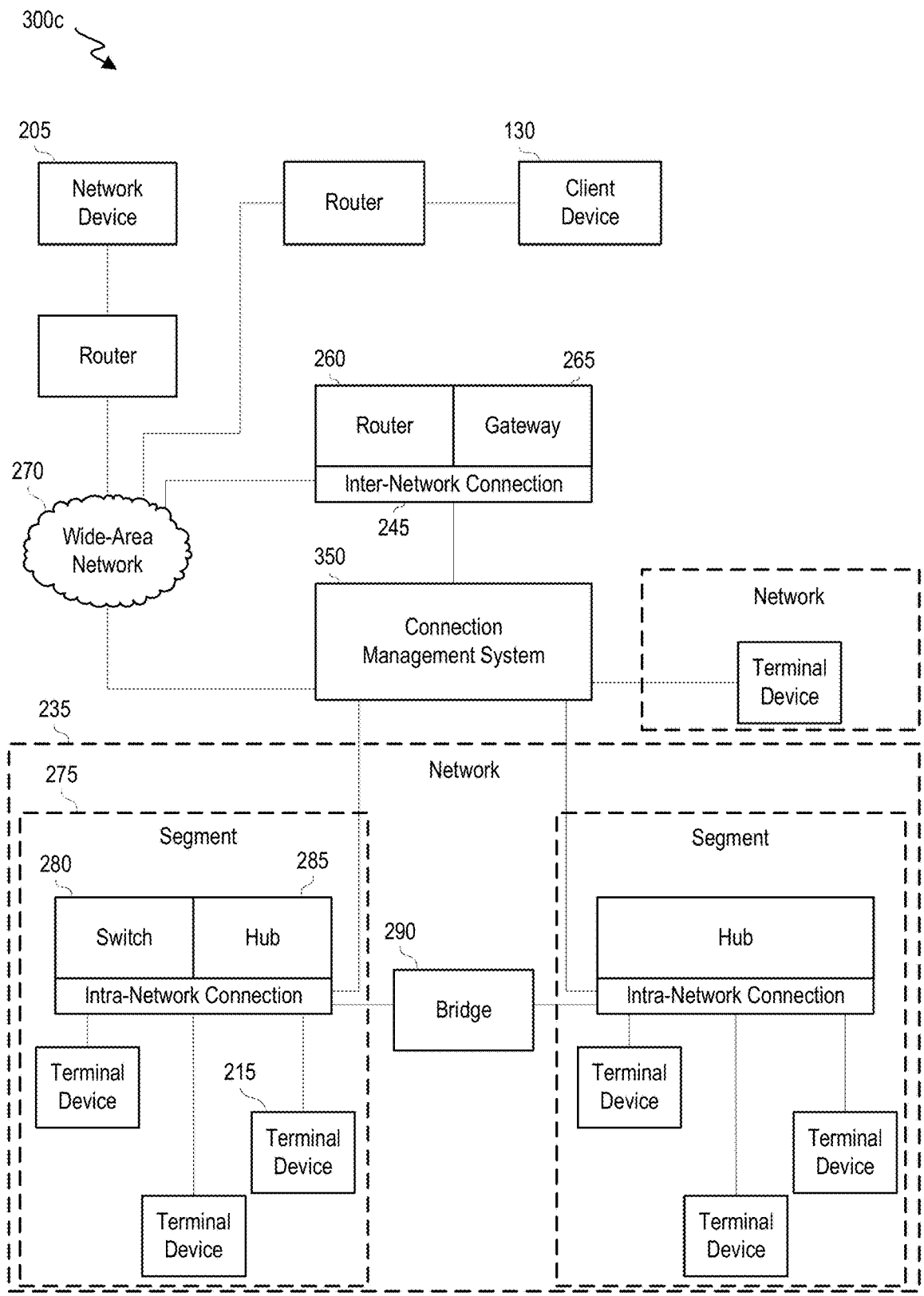

FIGS. 3A-3C show block diagrams of other embodiments of a network interaction system 300a-c that includes a connection management system. Each of the depicted systems 300a-c show only 2 local-area networks 235 for simplicity, though it can be appreciated that embodiments can be extended to expand the number of local-area networks. Each of systems 300a-c include a connection management system 350, which can identify which terminal device is to communicate with network device 205, can establish and manage (e.g., maintain or close) connection channels, can determine whether and when to re-route communications in an exchange, and so on. Thus, connection management system 350 can be configured to dynamically, and in real-time, evaluate communications, agent availability, capabilities of terminal devices or agents, and so on, to influence routing determinations.

In FIG. 3A, connection management system 350 is associated with each of network device 205 and a remote server 340 (e.g., connection management system 350a is associated with network device 205 and connection management system 350b is associated with remote server 340). For example, connection management system 350a and/or connection management system 350b can be installed or stored as an application on each of network device 205 and remote server 340, respectively. Execution of the application(s) can facilitate, for example, a communication between network device 205 and remote server 340 to identify a terminal device 215 selected to participate in a communication exchange with network device 205. The identification can be made based on one or more factors disclosed herein (e.g., availability, matching between a communication's topic/level of detail with agents' or terminal devices' knowledge bases, predicted latency, channel-type availability, and so on).

A client device 330 can provide client data indicating how routing determinations are to be made. For example, such data can include: indications as to how particular characteristics are to be weighted or matched or constraints or biases (e.g., pertaining to load balancing or predicted response latency). Client data can also include specifications related to when communication channels are to be established (or closed) or when communications are to be rerouted to a different network device. Client data can be used to define various client-specific rules, such as rules for communication routing and so on.

Connection management system 350b executing on remote server 340 can monitor various metrics pertaining to terminal devices (e.g., pertaining to a given client), such as which communication channels are supported, geographic and/or network proximity to a network device, communication latency and/or stability with the terminal device, a type of the terminal device, a capability of the terminal device, whether the terminal device (or agent) has communicated with a given network device (or user) before and/or characteristics of associated agents (e.g., knowledge bases, experience, languages spoken, availability, general personality or sentiment, etc.). Accordingly, communication management system 350b may be enabled to select routings to facilitate faster responses that more accurately and/or completely respond to a network-device communication based on the metrics.

In the example depicted in FIG. 3A, a communication exchange between network device 205 and remote server 340 can facilitate early identification of a destination address. Network device 205 may then use the destination address to direct subsequent communications. For example, network device 205 may send an initial communication to remote server 340 (e.g., via one or more inter-network connections and a wide-area network), and remote server 340 may identify one or more corresponding clients. Remote server 340 may then identify a set of terminal devices associated with the one or more corresponding clients and collect metrics for those terminal devices. The metrics can be evaluated (e.g., by remote server 340) so as to select a terminal device to involve in a communication exchange, and information pertaining to the terminal device (e.g., an IP address) can be sent to network device 205. In some embodiments, remote server 340 may continuously or periodically collect and evaluate metrics for various terminal devices and store evaluation results in a data store. In such embodiments, upon identifying a set of terminal devices associated with the one or more corresponding clients, remote server 340 can access the stored evaluation results from the data store and select a terminal device to involve in the communication exchange based on the stored evaluation results.

In FIG. 3B, connection management system 350 can be configured to serve as a relay and/or destination address. Thus, for example, a set of network devices 205 may transmit communications, each identifying connection management system 350 as a destination. Connection management system 350 can receive each communication and can concurrently monitor a set of terminal devices (e.g., so as to generate metrics for each terminal device). Based on the monitoring and a rule, connection management system 350 can identify a terminal device 215 to which it may relay each communication. Depending on the embodiment, terminal device communications may similarly be directed to a consistent destination (e.g., of connection management system 350) for further relaying, or terminal devices may begin communicating directly with corresponding network devices. These embodiments can facilitate efficient routing and thorough communication monitoring.

The embodiment depicted in FIG. 3C is similar to that in FIG. 3B. However, in some embodiments, connection management system 350 is directly connected to intra-network components (e.g., terminal devices, intra-network connections, or other).

It will be appreciated that many variations of FIGS. 3A-3C are contemplated. For example, connection management system 350 may be associated with a connection component (e.g., inter-network connection component 245 or intra-network connection component 255) such that an application corresponding to connection management system 350 (or part thereof) is installed on the component. The application may, for example, perform independently or by communicating with one or more similar or complementary applications (e.g., executing on one or more other components, network devices or remotes servers).

Figure 4:
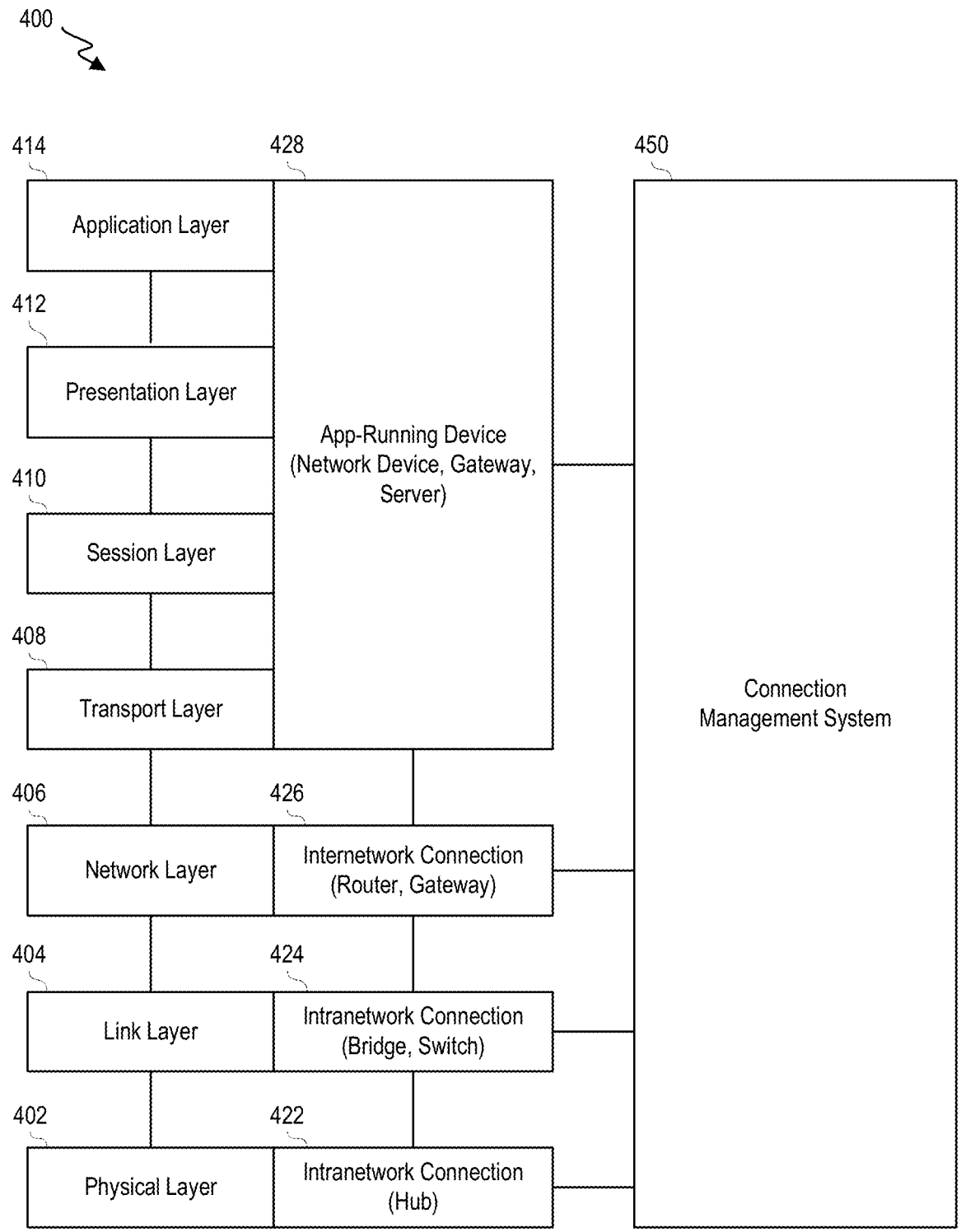
FIG. 4 shows a representation of a protocol-stack mapping of connection components' operation.

FIG. 4 shows a representation of a protocol-stack mapping 400 of connection components' operation. More specifically, FIG. 4 identifies a layer of operation in an Open Systems Interaction (OSI) model that corresponds to various connection components.

The OSI model can include multiple logical layers 402-414. The layers are arranged in an ordered stack, such that layers 402-412 each serve a higher level and layers 404-414 is each served by a lower layer. The OSI model includes a physical layer 402. Physical layer 402 can define parameters physical communication (e.g., electrical, optical, or electromagnetic). Physical layer 402 also defines connection management protocols, such as protocols to establish and close connections. Physical layer 402 can further define a flow-control protocol and a transmission mode.

A link layer 404 can manage node-to-node communications. Link layer 404 can detect and correct errors (e.g., transmission errors in the physical layer 402) and manage access permissions. Link layer 404 can include a media access control (MAC) layer and logical link control (LLC) layer.

A network layer 406 can coordinate transferring data (e.g., of variable length) across nodes in a same network (e.g., as datagrams). Network layer 406 can convert a logical network address to a physical machine address.

A transport layer 408 can manage transmission and receipt quality. Transport layer 408 can provide a protocol for transferring data, such as a Transmission Control Protocol (TCP). Transport layer 408 can perform segmentation/desegmentation of data packets for transmission and can detect and account for transmission errors occurring in layers 402-406. A session layer 410 can initiate, maintain and terminate connections between local and remote applications. Sessions may be used as part of remote-procedure interactions. A presentation layer 412 can encrypt, decrypt and format data based on data types known to be accepted by an application or network layer.

An application layer 414 can interact with software applications that control or manage communications. Via such applications, application layer 414 can (for example) identify destinations, local resource states or availability and/or communication content or formatting. Various layers 402-414 can perform other functions as available and applicable.

Intra-network connection components 422, 424 are shown to operate in physical layer 402 and link layer 404. More specifically, a hub can operate in the physical layer, such that operations can be controlled with respect to receipts and transmissions of communications. Because hubs lack the ability to address communications or filter data, they possess little to no capability to operate in higher levels. Switches, meanwhile, can operate in link layer 404, as they are capable of filtering communication frames based on addresses (e.g., MAC addresses).

Meanwhile, inter-network connection components 426, 428 are shown to operate on higher levels (e.g., layers 406-414). For example, routers can filter communication data packets based on addresses (e.g., IP addresses). Routers can forward packets to particular ports based on the address, so as to direct the packets to an appropriate network. Gateways can operate at the network layer and above, perform similar filtering and directing and further translation of data (e.g., across protocols or architectures).

A connection management system 450 can interact with and/or operate on, in various embodiments, one, more, all or any of the various layers. For example, connection management system 450 can interact with a hub so as to dynamically adjust which terminal devices the hub communicates. As another example, connection management system 450 can communicate with a bridge, switch, router or gateway so as to influence which terminal device the component selects as a destination (e.g., MAC, logical or physical) address. By way of further examples, a connection management system 450 can monitor, control, or direct segmentation of data packets on transport layer 408, session duration on session layer 410, and/or encryption and/or compression on presentation layer 412. In some embodiments, connection management system 450 can interact with various layers by exchanging communications with (e.g., sending commands to) equipment operating on a particular layer (e.g., a switch operating on link layer 404), by routing or modifying existing communications (e.g., between a network device and a terminal device) in a particular manner, and/or by generating new communications containing particular information (e.g., new destination addresses) based on the existing communication. Thus, connection management system 450 can influence communication routing and channel establishment (or maintenance or termination) via interaction with a variety of devices and/or via influencing operating at a variety of protocol-stack layers.

Figure 5:
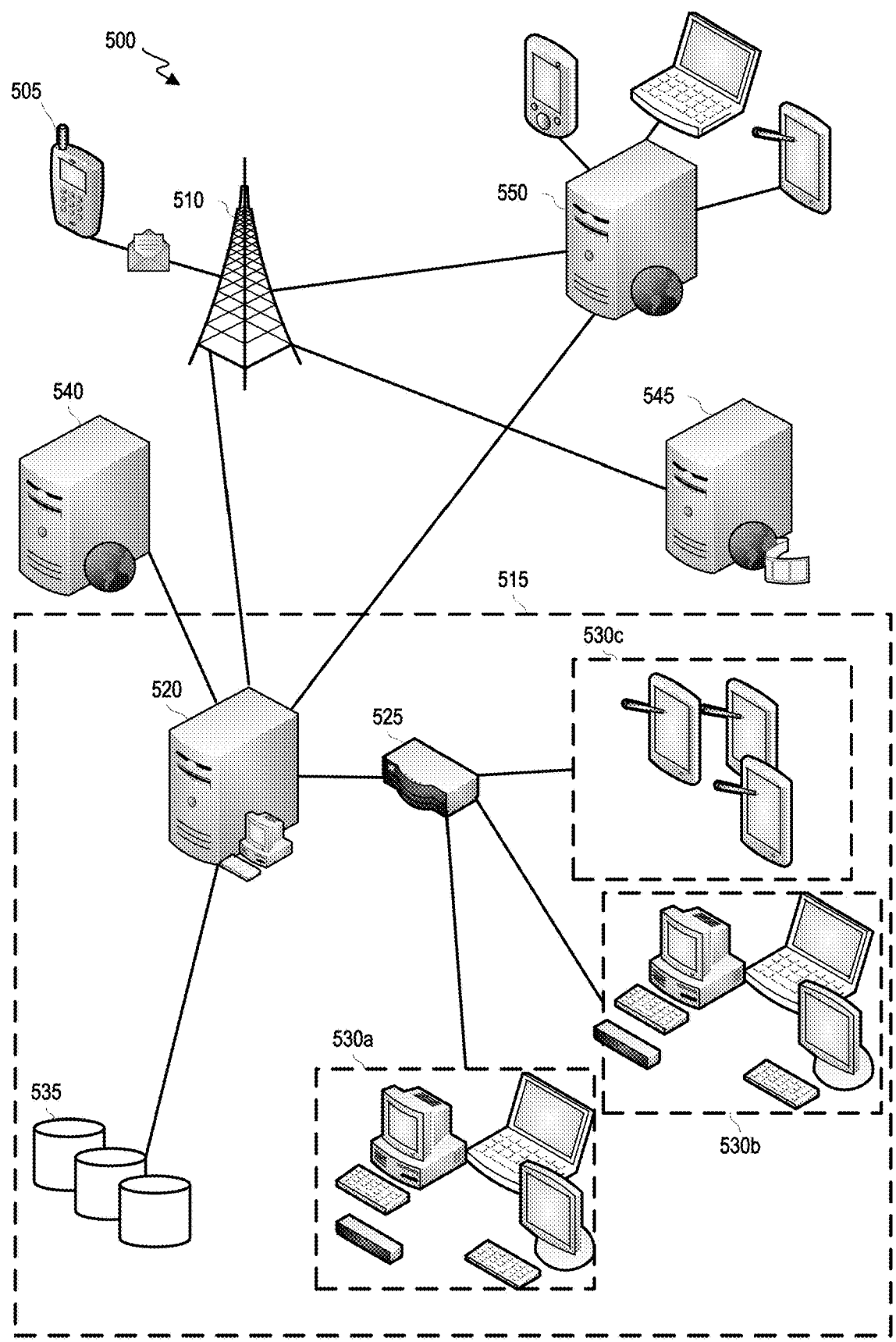
FIG. 5 represents a multi-device communication exchange system according to an embodiment.

FIG. 5 represents a multi-device communication exchange system 500 according to an embodiment. System 500 includes a network device 505 configured to communicate with a variety of types of terminal devices over a variety of types of communication channels.

In the depicted instance, network device 505 can transmit a communication over a cellular network (e.g., via a base station 510). The communication can be routed to an operative network 515. Operative network 515 can include a connection management system 520 that receives the communication and identifies which terminal device is to respond to the communication. Such determination can depend on identifying a client to which that communication pertains (e.g., based on a content analysis or user input indicative of the client) and determining one or more metrics for each of one or more terminal devices associated with the client. For example, in FIG. 5, each cluster of terminal devices 530a-c can correspond to a different client. The terminal devices may be geographically co-located or disperse. The metrics may be determined based on stored or learned data and/or real-time monitoring (e.g., based on availability).

Connection management system 520 can communicate with various terminal devices via one or more routers 525 or other inter-network or intra-network connection components. Connection management system 520 may collect, analyze and/or store data from or pertaining to communications, terminal-device operations, client rules, and/or user-associated actions (e.g., online activity, account data, purchase history, etc.) at one or more data stores. Such data may influence communication routing.

Notably, various other devices can further be used to influence communication routing and/or processing. For example, in the depicted instance, connection management system 520 also is connected to a web server 540. Thus, connection management system 540 can retrieve data of interest, such as technical product details, news, current product offerings, current or predicted weather, and so on.

Network device 505 may also be connected to a web server (e.g., including a streaming web server 545). In some instances, communication with such a server provided an initial option to initiate a communication exchange with connection management system 520. For example, network device 505 may detect that, while visiting a particular webpage, a communication opportunity is available and such an option can be presented.

One or more elements of communication system 500 can also be connected to a social-networking server 550. Social networking server 550 can aggregate data received from a variety of user devices. Thus, for example, connection management system 520 may be able to estimate a general (or user-specific) sentiment towards a given topic or estimate a general behavior of a given user or class of users.

Figure 6:
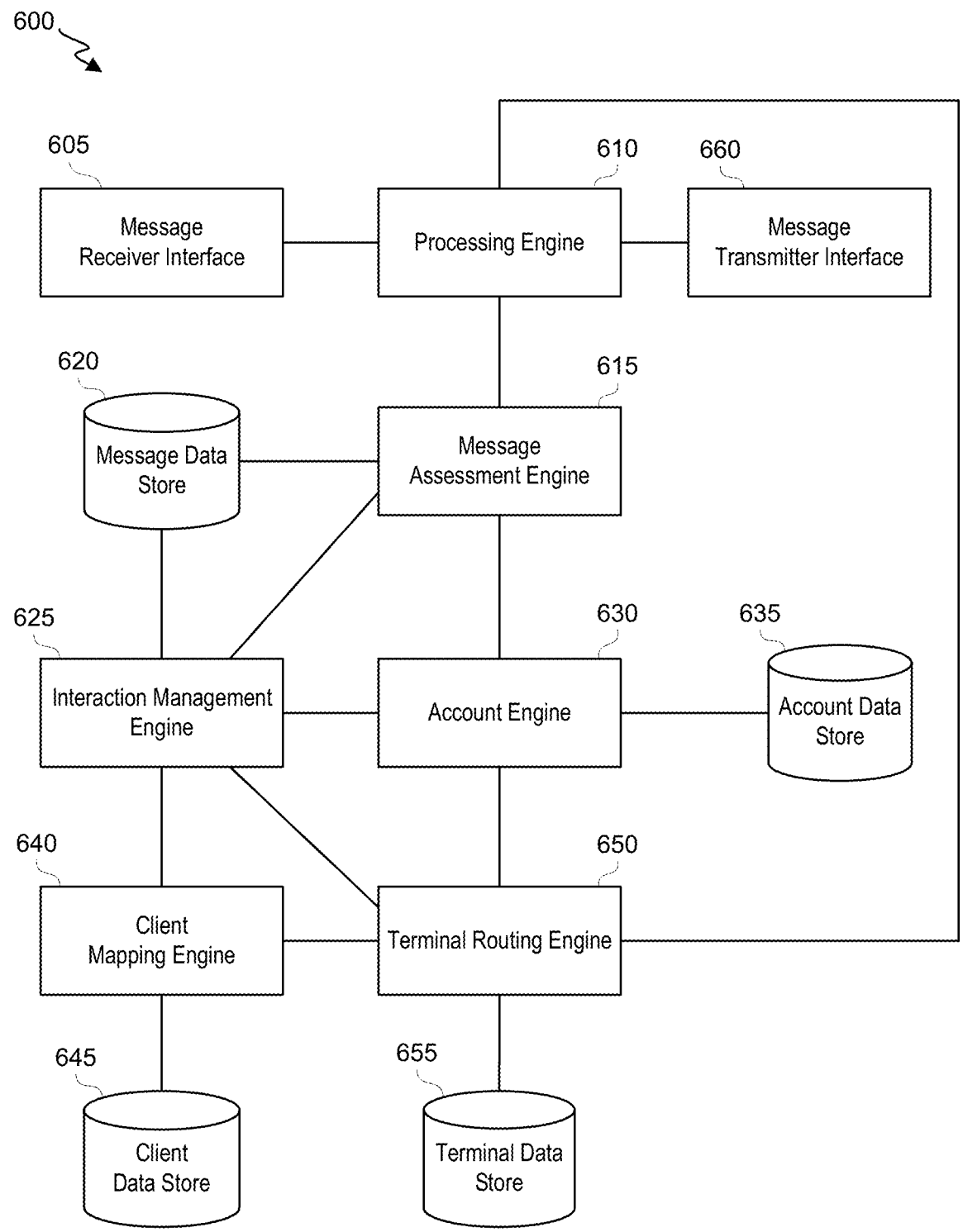
FIG. 6 shows a block diagram of an embodiment of a connection management system.

FIG. 6 shows a block diagram of an embodiment of a connection management system 600. A message receiver interface 605 can receive a message. In some instances, the message can be received, for example, as part of a communication transmitted by a source device (e.g., housed separately from connection management system 600 or within a same housing), such as a network device or terminal device. In some instances, the communication can be part of a series of communications or a communicate exchange, which can include a series of messages or message exchange being routed between two devices (e.g., a network device and terminal device). This message or communication exchange may be part of and/or may define an interaction between the devices. A communication channel or operative channel can include one or more protocols (e.g., routing protocols, task-assigning protocols and/or addressing protocols) used to facilitate routing and a communication exchange between the devices.

In some instances, the message can include a message generated based on inputs received at a local or remote user interface. For example, the message can include a message that was generated based on button or key selection or recorded speech signals. In one instance, the message includes an automatically generated message, such as one generated upon detecting that a network device is presenting a particular app page or webpage or has provided a particular input command (e.g., key sequence). The message can include an instruction or request, such as one to initiate a communication exchange.

In some instances, the message can include or be associated with an identifier of a client. For example, the message can explicitly identify the client (or a device associated with the client); the message can include or be associated with a webpage or app page associated with the client; the message can include or be associated with a destination address associated with a client; or the message can include or be associated with an identification of an item (e.g., product) or service associated with the client (e.g., being offered for sale by the client, having been sold by the client or being one that the client services). To illustrate, a network device may be presenting an app page of a particular client, which may offer an option to transmit a communication to an agent. Upon receiving user input corresponding to a message, a communication may be generated to include the message and an identifier of the particular client.

A processing engine 610 may process a received communication and/or message. Processing can include, for example, extracting one or more particular data elements (e.g., a message, a client identifier, a network-device identifier, an account identifier, and so on). Processing can include transforming a formatting or communication type (e.g., to be compatible with a particular device type, operating system, communication-channel type, protocol and/or network).

A message assessment engine 615 may assess the (e.g., extracted or received) message. The assessment can include identifying, for example, one or more categories or tags for the message. Examples of category or tag types can include (for example) topic, sentiment, complexity, and urgency. A difference between categorizing and tagging a message can be that categories can be limited (e.g., according to a predefined set of category options), while tags can be open. A topic can include, for example, a product, a service, a technical issue, a use question, a complaint, a refund request or a purchase request. A category or tag can be determined, for example, based on a semantic analysis of a message (e.g., by identifying keywords, sentence structures, repeated words, punctuation characters and/or non-article words); user input (e.g., having selected one or more categories); and/or message-associated statistics (e.g., typing speed and/or response latency).

In some instances, message assessment engine 615 can determine a metric for a message. A metric can include, for example, a number of characters, words, capital letters, all-capital words or instances of particular characters or punctuation marks (e.g., exclamation points, question marks and/or periods). A metric can include a ratio, such as a fraction of sentences that end with an exclamation point (or question mark), a fraction of words that are all capitalized, and so on.

Message assessment engine 615 can store a message, message metric and/or message statistic in a message data store 620. Each message can also be stored in association with other data (e.g., metadata), such as data identifying a corresponding source device, destination device, network device, terminal device, client, one or more categories, one or more stages and/or message-associated statistics). Various components of connection management system 600 (e.g., message assessment engine 615 and/or an interaction management engine 625) can query message data store 620 to retrieve query-responsive messages, message metrics and/or message statistics.

An interaction management engine 625 can determine to which device a communication is to be routed and how the receiving and transmitting devices are to communicate. Each of these determinations can depend, for example, on whether a particular network device (or any network device associated with a particular user) has previously communicated with a terminal device in a set of terminal devices (e.g., any terminal device associated with connection management system 600 or any terminal device associated with one or more particular clients).

In some instances, when a network device (or other network device associated with a sane user or account) has previously communicated with a given terminal device (e.g., about matters relating to a client), communication routing can be generally biased towards the same terminal device. Other factors that may influence routing can include, for example, an inferred or identified user or agent sentiment pertaining to the previous communication; a topic of a present communication (e.g., and an extent to which that relates to a topic of a previous communication and/or a knowledge base associated with one or more terminal devices or agents); whether the terminal device (or corresponding agent) is available; and/or a predicted response latency of the terminal device. Such factors may be considered absolutely or relative to similar metrics corresponding to other terminal devices. A re-routing rule (e.g., a client-specific or general rule) can indicate how such factors are to be assessed and weighted to determine whether to forego agent consistency.

When a network device (or other network device associated with a same user or account) has not previously communicated with a given terminal device (e.g., about matters relating to a client), a terminal-device selection can be performed based on factors such as, for example, an extent to which various agents' knowledge base corresponds to a communication topic, availability of various agents at a given time and/or over a channel type, types and/or capabilities of terminal devices (e.g., associated with the client), a language match between a user and agents, and/or a personality analyses. In one instance, a rule can identify how to determine a sub-score to one or more factors such as these and a weight to assign to each score. By combining (e.g., summing) weighted sub-scores, a score for each agent can be determined. A terminal device selection can then be made by comparing terminal devices' scores (e.g., to select a high or highest score).

With regard to determining how devices are to communicate, interaction management engine 625 can (for example) determine whether a terminal device is to respond to a communication via (for example) email, online chat, SMS message, voice call, video chat, etc. A communication type can be selected based on, for example, a communication-type priority list (e.g., at least partly defined by a client or user); a type of a communication previously received from the network device (e.g., so as to promote consistency), a complexity of a received message, capabilities of the network device, and/or an availability of one or more terminal devices. Appreciably, some communication types will result in real-time communication (e.g., where fast message response is expected), while others can result in asynchronous communication (e.g., where delays (e.g., of several minutes or hours) between messages are acceptable).

Further, interaction management engine 625 can determine whether a continuous channel between two devices should be established, used or terminated. A continuous channel can be structured so as to facilitate routing of future communications from a network device to a specified terminal device. This bias can persist even across message series (e.g., days, weeks or months). In some instances, a representation of a continuous channel (e.g., identifying an agent) can be included in a presentation to be presented on a network device. In this manner, a user can understand that communications are to be consistently routed so as to promote efficiency.

In one instance, a score can be generated using one or more factors described herein and a rule (e.g., that includes a weight for each of the one or more factors) to determine a connection score corresponding to a given network device and terminal device. The score may pertain to an overall match or one specific to a given communication or communication series. Thus, for example, the score may reflect a degree to which a given terminal device is predicted to be suited to respond to a network-device communication. In some instances, a score analysis can be used to identify each of a terminal device to route a given communication to and whether to establish, use or terminate a connection channel. When a score analysis is used to both address a routing decision and a channel decision, a score relevant to each decision may be determined in a same, similar or different manner.

Thus, for example, it will be appreciated that different factors may be considered depending on whether the score is to predict a strength of a long-term match versus one to respond to a particular message query. For example, in the former instance, considerations of overall schedules and time zones may be important, while in the latter instance, immediate availability may be more highly weighted. A score can be determined for a single network-device/terminal-device combination, or multiple scores can be determined, each characterizing a match between a given network device and a different terminal device.

To illustrate, a set of three terminal devices associated with a client may be evaluated for potential communication routing. A score may be generated for each that pertains to a match for the particular communication. Each of the first two terminal devices may have previously communicated with a network device having transmitted the communication. An input from the network device may have indicated satisfaction with an interaction with the communication(s) with the first device. Thus, a past-interact sub-score (as calculated according to a rule) for the first, second and third devices may be 10, 5, and 0, respectively. (Negative satisfaction inputs may result in negative sub-scores.) It may be determined that only the third terminal device is immediately available. It may be predicted that the second terminal device will be available for responding within 15 minutes, but that the first terminal device will not be available for responding until the next day. Thus, a fast-response sub-score for the first, second and third devices may be 1, 3 and 10. Finally, it may be estimated a degree to which an agent (associated with the terminal device) is knowledgeable about a topic in the communication. It may be determined that an agent associated with the third terminal device is more knowledgeable than those associated with the other two devices, resulting in sub-scores of 3, 4 and 9. In this example, the rule does not include weighting or normalization parameters (though, in other instances, a rule may), resulting in scores of 14, 11 and 19. Thus, the rule may indicate that the message is to be routed to a device with the highest score, that being the third terminal device. If routing to a particular terminal device is unsuccessful, the message can be routed to a device with the next-highest score, and so on.

A score may be compared to one or more absolute or relative thresholds. For example, scores for a set of terminal devices can be compared to each other to identify a high score to select a terminal device to which a communication can be routed. As another example, a score (e.g., a high score) can be compared to one or more absolute thresholds to determine whether to establish a continuous channel with a terminal device. An overall threshold for establishing a continuous channel may (but need not) be higher than a threshold for consistently routing communications in a given series of messages. This difference between the overall threshold and threshold for determining whether to consistently route communication may be because a strong match is important in the continuous-channel context given the extended utility of the channel. In some embodiments, an overall threshold for using a continuous channel may (but need not) be lower than a threshold for establishing a continuous channel and/or for consistently routing communications in a given series of messages.

Interaction management engine 625 can interact with an account engine 630 in various contexts. For example, account engine 630 may look up an identifier of a network device or terminal device in an account data store 635 to identify an account corresponding to the device. Further, account engine 630 can maintain data about previous communication exchanges (e.g., times, involved other device(s), channel type, resolution stage, topic(s) and/or associated client identifier), connection channels (e.g., indicating—for each of one or more clients—whether any channels exist, a terminal device associated with each channel, an establishment time, a usage frequency, a date of last use, any channel constraints and/or supported types of communication), user or agent preferences or constraints (e.g., related to terminal-device selection, response latency, terminal-device consistency, agent expertise, and/or communication-type preference or constraint), and/or user or agent characteristics (e.g., age, language(s) spoken or preferred, geographical location, interests, and so on).

Further, interaction management engine 625 can alert account engine 630 of various connection-channel actions, such that account data store 635 can be updated to reflect the current channel data. For example, upon establishing a channel, interaction management engine 625 can notify account engine 630 of the establishment and identify one or more of: a network device, a terminal device, an account and a client. Account engine 635 can (in some instances) subsequently notify a user of the channel's existence such that the user can be aware of the agent consistency being availed.

Interaction management engine 625 can further interact with a client mapping engine 640, which can map a communication to one or more clients (and/or associated brands). In some instances, a communication received from a network device itself includes an identifier corresponding to a client (e.g., an identifier of a client, product, service, webpage, or app page). The identifier can be included as part of a message (e.g., which client mapping engine 640 may detect) or included as other data in a message-inclusive communication. Client mapping engine 640 may then look up the identifier in a client data store 645 to retrieve additional data about the client and/or an identifier of the client.

In some instances, a message may not particularly correspond to any client. For example, a message may include a general query. Client mapping engine 640 may, for example, perform a semantic analysis on the message, identify one or more keywords and identify one or more clients associated with the keyword(s). In some instances, a single client is identified. In some instances, multiple clients are identified. An identification of each client may then be presented via a network device such that a user can select a client to communicate with (e.g., via an associated terminal device).

Client data store 645 can include identifications of one or more terminal devices (and/or agents) associated with the client. A terminal routing engine 650 can retrieve or collect data pertaining to each of one, more or all such terminal devices (and/or agents) so as to influence routing determinations. For example, terminal routing engine 650 may maintain a terminal data store 655, which can store information such as terminal devices' device types, operating system, communication-type capabilities, installed applications accessories, geographic location and/or identifiers (e.g., IP addresses). Information can also include agent information, such as experience level, position, skill level, knowledge bases (e.g., topics that the agent is knowledgeable about and/or a level of knowledge for various topics), personality metrics, working hours, language(s) spoken and/or demographic information. Some information can be dynamically updated. For example, information indicating whether a terminal device is available may be dynamically updated based on (for example) a communication from a terminal device (e.g., identifying whether the device is asleep, being turned off/on, idle/active, or identifying whether input has been received within a time period); a communication routing (e.g., indicative of whether a terminal device is involved in or being assigned to be part of a communication exchange); or a communication from a network device or terminal device indicating that a communication exchange has ended or begun.

It will be appreciated that, in various contexts, being engaged in one or more communication exchanges does not necessarily indicate that a terminal device is not available to engage in another communication exchange. Various factors, such as communication types (e.g., message, email, chat, phone), client-identified or user-identified target response times, and/or system loads (e.g., generally or with respect to a user) may influence how many exchanges a terminal device may be involved in.

When interaction management engine 625 has identified a terminal device to involve in a communication exchange or connection channel, it can notify terminal routing engine 650, which may retrieve any pertinent data about the terminal device from terminal data store 655, such as a destination (e.g., IP) address, device type, protocol, etc. Processing engine 610 can then (in some instances) modify the message-inclusive communication or generate a new communication (including the message) so as to have a particular format, comply with a particular protocol, and so on. In some instances, a new or modified message may include additional data, such as account data corresponding to a network device, a message chronicle, and/or client data.

A message transmitter interface 660 can then transmit the communication to the terminal device. The transmission may include, for example, a wired or wireless transmission to a device housed in a separate housing. The terminal device can include a terminal device in a same or different network (e.g., local-area network) as connection management system 600. Accordingly, transmitting the communication to the terminal device can include transmitting the communication to an inter- or intra-network connection component.

It will be appreciated that connection management system 600 can include communication server 180. For example, connection management system 600 can enable remote-control capabilities for controlling mobile applications running on mobile devices during communication sessions between network devices and terminal devices. It will be appreciates that connection management system 600 can use communication server 180, network device 105, and/or terminal device 115 to perform any of processes 800 through 1200 as described herein.

Figure 7:
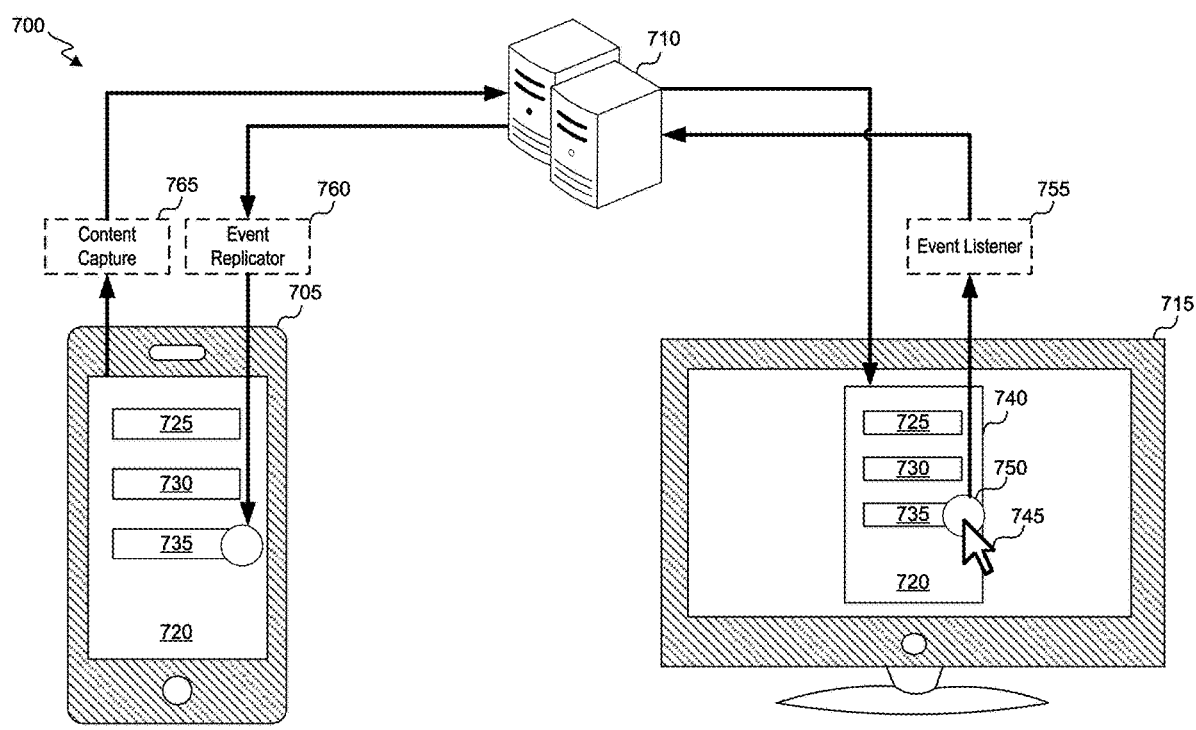
FIG. 7 shows a representation of an interaction environment for real-time remote control of mobile applications.

FIG. 7 shows a representation of interaction environment 700 for real-time remote control of mobile applications. Interaction environment 700 can include network device 705, communication server 710, and terminal device 715. Further, interaction environment 700 can facilitate remote control of a mobile application being executed on network device 705. For example, terminal device 715 can remotely control a mobile application that is executing on network device 705. In some examples, a mobile application (e.g., a mobile native application) may include executable code (stored in the mobile device or at one or more external servers) that can be executed using the operating system of the network device 705 (e.g., a smartphone). In some examples, the mobile application may include a hybrid mobile application that is comprised of native user interface (UI) components (generated and stored at the mobile device), but is written in an interpreted language (e.g., using Web-based coding languages). The present disclosure is not limited to mobile native applications or hybrid applications, and thus, any type of mobile application may be used in the methods described herein.

Network device 705 and terminal device 715 can each include, for example, a portable electronic device (e.g., a smart phone, tablet, laptop computer, or smart wearable device) or a non-portable electronic device (e.g., one or more desktop computers, smart appliances, servers, and/or processors). Further, network device 705 can be a different device from terminal device 715. While FIG. 7 illustrates network device 705 as a smart phone and terminal device 715 as a desktop computer, it will be appreciated that each of network device 705 and terminal device 715 can be any portable or non-portable electronic device.

In some instances, network device 705 can be operated by a user (e.g., a customer) and terminal device 715 can be operated by an agent. A mobile application stored on network device 705 can be executed when input corresponding to selection of the application is received at the network device. For example, the user can tap or touch the screen of network device 705 at the location of an icon representing the mobile application, and mobile application can be executed. Executing the mobile application can include booting or running the application on network device 705. Further, the mobile application can include program code stored on network device 705. The program code can include a portion of code (e.g., a software development kit (SDK)) that can be embedded in the program code. The SDK embedded in the mobile application can include instructions or a set of operations for performing tasks that enable a terminal device (e.g., terminal device 715) to remotely control the mobile application executing on a network device (e.g., network device 705). For example, the program code, when executed, can boot the mobile application and processes described in FIGS. 7-12 can be performed. In some instances, when the execution of the mobile application is initiated, a communication session between the network device 705 and terminal device 715 can be established. For example, input can be received at network device 705 corresponding to a selection (e.g., touch or tap) of a button presented by the mobile application. Tapping or touching the button can cause a communication session to be established with a terminal device (e.g., terminal device 715). The communication session can facilitate real-time screen sharing of the mobile application executing on network device 705. For example, the real-time screen sharing can include two-way interactivity between network device 705 and terminal device 715. In some instances, the communication session can also include voice or video channels. For example, the user and the agent can communicate with each other over the voice or video channels. Example processes for establishing the communication session are described in further detail below.

In addition, terminal device 715 can be operated by an agent. In some instances, the agent can access a website using a browser that is running on terminal device 715. For example, the website can include a console that is running on the browser of terminal device 715. The agent can be logged into the console using the browser. One or more log-in credentials (e.g., username, password, and the like)

can be used to authenticate the agent's identity before allowing the agent to gain access to the console or web applications included in the console. Examples of a console can include a platform that includes one or more APIs (application programming interfaces), a dashboard including one or more functions, a web-hosted application running on a web browser (without the need for downloading plug-ins) that is capable of establishing or joining a communication session, and other suitable interfaces. Further, the console can include one or more web applications or functions that can be executed. The web applications or functions can be executed at the browser, at communication server 710, a local server, a remote server, or other suitable computing device. For example, the one or more web applications can establish the communication session for real-time screen-sharing of the screens presented by the mobile application. In this example, terminal device 715 can display a screen presented by the mobile application running on network device 705. Further, the agent operating terminal device 715 can control various aspects (e.g., input elements) of the mobile application running on network device 705 through the established communication channels (e.g., using the web applications included in the console).

Advantageously, when the mobile application is executing on network device 705, the user operating network device 705 does not need to download any plug-ins or additional software to join or establish a communication session and share the screen of network device 705 with the agent operating terminal device 715. The program code of the mobile application includes a set of operations (e.g., the SDK) that can establish, manage, and terminate the real-time, screen-sharing communication session between network device 705 and terminal device 715. As a non-limiting example, the mobile application executing on network device 705 can receive input corresponding to a selection of an icon (e.g., tap, double tap, touch, select, click) displayed on the screen of network device 705. Once selected, the icon can boot the mobile application. The mobile application can then present one or more pages on the screen of network device 705. In some instances, the one or more pages can include a button that, when selected, can initiate a communication session with an agent operating a terminal device (e.g., terminal device 715). In this example, the communication session can enable the agent to view and control the screen presented on network device 705 in real-time. Further, the communication session can be established without the user or the agent needing to download any additional plug-in or code to implement the real-time screen sharing of network device. For example, the program code of the mobile application executing on network device 705 can include a portion of code (e.g., the SDK) that enables the user to join the communication session. Similarly, the agent can invite the user to join the communication session for real-time screen sharing without needing to download any additional plug-in or code to implement the real-time screen sharing. For example, the web application executing at the browser of terminal device 715 (or accessed by the browser) can include functions or a set of operations that can establish, manage, or terminate the communication session.

Additionally, as an advantage, both the user and the agent can simultaneously perform actions (e.g., input events) without manually handing over control to the other during the communication session. For example, the user can perform a manual action (e.g., typing text into a text field) within the mobile application that is executing on network device 705. The user's actions are monitored and changes to the displayed screen of the mobile application (e.g., typed letters, zoom in, zoom out, scroll, and the like) are captured, transmitted, and displayed on terminal device 715. For example, an image of the displayed screen of the mobile application executing on network device 705 can be reproduced in real-time on terminal device 715. Further, the agent can perform actions (e.g., a click) on the image, and the agent's actions can be captured, transmitted, and replicated in the mobile application executing at the network device 705 in real-time.

The mobile application executing at network device 705 can be developed by an entity or client (e.g., a company). The program code of the mobile application can include a portion of code (e.g., libraries, operations, instructions, processes, and the like) that implement or support the communication session for real-time screen sharing and collaborative browsing of the mobile application executing at network device 705. For example, the mobile application can include an SDK, and the SDK can include mobile code libraries that are built into the mobile application to support the real-time remote control capabilities during the communication session. The SDK can add capabilities to the mobile application, such as screen sharing, remote application control, voice transmission, and video transmission. For example, the SDK can run on Android or iOS operating systems. It will be appreciated that the SDK can run on other operating systems as well.

As another example, remote application control can be the capability of an agent to remotely control the mobile application executing on network device 705 without having access to the particular mobile application or network device at the agent's physical location. Examples of the remote control can include controlling haptic user input actions at network device 705 by replicating input events (e.g., touch, click, scroll, and the like), and text input (e.g., typing). Further, the agent operating terminal device 715 may or may not be associated with the entity or client. The console, website, or web application that is accessed by the browser of terminal device 715 may or may not be associated with the entity or client. For example, the mobile application can be administered or operated by an entity, and the console, website, or web application can be administered or operated by another entity.

Communication server 710 can include one or more servers that are configured to establish a communication session between network device 705 and terminal device 715. Further, communication server 710 can be the same as communication server 180. For example, communication server 710 can be the server through which network device 705 and terminal device 715 exchange data (e.g., messages, media streams, screenshots, event data, and the like) during a communication session.

In some instances, to establish a communication session between network device 705 and terminal device 715, terminal device 715 can transmit an invitation message to network device 705. For example, terminal device 715 can create a particular communication session on communication server 710. Creating the particular communication session can include defining capabilities and settings of the communication session. Further, communication server 710 can issue an invite for the particular communication session created by terminal device 715. Terminal device 715 can then transmit the invite in an invitation message to network device 705. For example, the invitation message can include data representing a request to join the particular communication session. In some instances, the invitation message can be transmitted to network device 705 using a messaging service (e.g., text message, asynchronous messaging servers, chat message, and the like). If communication server 710 receives an accept message from network device 705, then network device 705 can join the particular session created on communication server 710. For example, the communication session can begin with a handshake between network device 705 and terminal device 715. In some instances, the communication session can be a real-time communication session that enables terminal device 715 to remotely control an application running (e.g., executing) on network device 705. Advantageously, if a user operating network device 705 is experiencing an issue with a mobile application executing on network device 705, a communication session can be established using communication server 710, which allows terminal device 715 to collaboratively navigate the mobile application with the user of network device 705.

In some instances, terminal device 715 can request a service identifier from an application server (e.g., the server communicating with the SDK embedded in the application executing on network device 705). In some instances, the service identifier can any alphanumeric string of data and can be transmitted to network device 705 using any means of communication. For example, the service identifier can be sent to network device 705 using text messages, email, over a phone call, chat message, voice over IP call, and other suitable means of communication. Further, network device 705 can obtain a service identifier from the application server. Network device 705 can request a communication session from communication server 710 using the service identifier. After acceptance of the request, the communication session between terminal device 715 and network device 705 can be established. In some instances, the mobile application executing on network device 705 can receive input corresponding to a selection of a button (e.g., click, tap, touch) within an application executing on network device 705. After the button is selected, the network device can be automatically connected to an available terminal device and a real-time communication session between the network device and the terminal device can begin.

Referring to the example illustration of FIG. 7, when executing, the mobile application can include one or more pages that are displayed on network device 705. It will be appreciated that the mobile application can present any number of pages on network device 705. For example, the mobile application can present display 720, which can include input elements 725, 730, and 735. Display 720 can be a page that includes any number of input elements, or no input elements at all. Further, display 720 can include any combination of a background image, a foreground image, or any other image(s). In some instances, display 720 can be interactive in that display 720 can respond to interactions or inputs provided by the user operating network device 705. For example, display 720 can be scrolled (e.g., up, down, sideways), zoomed in, zoomed out, or any other suitable interaction by the user operating network device 705.

An input element can be a user interface element that is configured to receive input data. Examples of input elements can include buttons, radio buttons, switches, a drop down menu, segmented controls, text fields, text areas, scroll elements (e.g., arrows that initiate a scroll feature), and other suitable input elements. An input element can be at an initial state (e.g., a button that has not been selected, an empty text field, an unselected or selected radio button, and so on). Input elements can also receive the input data based on interactions with the user operating network device 705. For example, a text field can receive character letters (e.g., input data) based on key strokes (or key taps) performed by the user on a keyboard displayed on network device 705. In addition, an input element can be associated with a defined action and/or a defined input boundary. The defined action and input boundary associated with an input element can be coded into the mobile application and accessible by the operating system of network device 705. Examples of a defined action can include toggling a radio button, selecting a text field, entering a character into a text field, deleting a character in a text field, selecting a button, scrolling the displayed screen, and other suitable actions. A particular input element can be associated with a particular defined action coded in the mobile application. Further, the input boundary can be an area for receiving the input data (e.g., a keystroke, a selection of button or radio button, and so on). Further, the input boundary can be any shape (e.g., a rectangle, circle, oval, square, and so on). For example, the input boundary for a text field can include the area of the box into which text can be typed.

In some instances, the mobile application can include content capture engine 765. For example, content capture engine 765 can be configured to continuously capture content data related to the mobile application. Examples of content data can include screenshots, images, video data, content, media, and so on, displayed at on a screen of network device 705, video data captured at a camera of network device 705, audio data captured at a microphone of network device 705, data representing input events (e.g., taps, swipes, clicks, and the like), metadata (e.g., metadata associated with the screenshots, images, video, data representing input events, and the like), and other suitable content. As a non-limiting example, during the communication session, the mobile application can periodically (e.g., every millisecond, second, few seconds, minutes, and so on) capture a screenshot of the screen presented by the mobile application that is executing on network device 705. The mobile application can then generate a data stream that includes the content data. As a non-limiting example, WebRTC (web real-time communications) protocols can be used to encode (e.g., down sample) the content data and generate a data stream for transmission to terminal device 715 by way of communication server 710. It will be appreciated that other protocols may be used to encode the content data and transmit a data stream that includes the content data to terminal device 715. The encoded data stream can be transmitted from network device 705 to communication server 710 during the communication session. Communication server 710 can then transmit the encoded data stream to terminal device 715 during the communication session to facilitate the real-time screen sharing and remote control capabilities associated with the communication session. The data stream transmitted from the network device can include identifiers of the communication session, the network device, the terminal device, or other identification parameters associated with the communication session.

Advantageously, the data stream includes content data (e.g., continuous screen shots of the mobile application) and the event listener separately detects input events performed at the agent's interface and/or at the mobile application. The use of event listeners enables the agent to remotely control the mobile application running on user's mobile device in a manner that imposes minimal burden on the communication channels of the network and processing resources. The speed and reliability of real-time communication between the terminal device and the network device can be enhanced using the event listeners. For example, operation of the user's mobile device can be improved because the event replicator replicates the events detected by the event listener operating on the agent's device. Because a specific set of input events is processed (e.g., clicks or taps) and other events are filtered out (e.g., the agent's cursor movement), the data transmitted from the agent device to the user's device (e.g., the coordinates of the detected click) can be minimized so as to reduce the processing load experienced at the user's device. Further, the input events (e.g., a click, but not the movement of the cursor) are transmitted from the agent's device to the user's mobile device, and this minimal amount of data reduces the delay experienced at the user's mobile device during the communication session.

When terminal device 715 receives the encoded data stream, terminal device 715 can extract the content data from the data stream and display (or output) the content data. In some instances, terminal device 715 can display content 740. For example, content 740 can include a real-time (e.g., current) video of the screen presented by the mobile application executing on network device 705. Content 740 can be based on the content data that is captured by content capture engine 765 at network device 705. The data stream is received on an on-going basis (e.g., continuously). As such, when display 720 is modified (e.g., by scrolling down), the modification of display 720 is represented in content 740 on terminal device 715 in real-time. As another example, the content data included in the data stream can include audio data captured at a microphone of network device 705. In this example, content 740 can be outputted at terminal device 715. Further, in this example, outputting content 740 can include converting the audio data to a sound using a speaker of terminal device 715, instead of displaying content 740 as shown in FIG. 7.

Event listener 755 can include executable code or a set of operations that perform a function. In some instances, event listener 755 can be executed at the web browser that is running on terminal device, and in other instances, event listener 755 can be executed at communication server 710. Further, event listener 755 can detect an input event performed at terminal device 715 by the agent. Examples of an input event can include a mouse click (single click or double click), tap, double tap, touch, swipe, scroll, multi-touch, a particular movement or gesture imposed on the terminal device and that is detected at a motion sensor or gyroscope of the terminal device, and other suitable input events. As a non-limiting example, if the agent selects (e.g., clicks on) a location of content 740, the selection (e.g., click) can be detected by event listener 755.

Referring to the example illustration in FIG. 7, pointer 745 can be moved according to the movement detected by a mouse device (not shown) of terminal device 715. For example, the agent can be operating the mouse device to move pointer 745 around the screen of terminal device 715. At any time, the agent can manually perform a click 750, which can be detected by event listener 755 as an input event at the web browser running on terminal device 715. When event listener 755 detects the input event at the web browser of terminal device 715, event listener 755 can generate selection data that corresponds to the detected input event. For example, when event listener 755 detects click 750, event listener 755 can determine the coordinates (e.g., x-coordinate and y-coordinate) of the location at which click 750 occurred. The coordinates can be included in the selection data generated by event listener 755. Other examples of the selection data can include metadata associated with processing of click 750 (e.g., time of the click, duration of the click, whether the click was a single click or double click, and so on), whether the click was a left-click or a right-click, and other suitable data. After event listener 755 detects the input event, event listener 755 can generate the selection data, which is associated with the selection that was performed at terminal device 715, and then transmit the selection data to communication server 710. Communication server 710 can receive the selection data and transmit the selection data to network device 705.

In some instances, when the selection data is received at network device 705, network device 705 can replicate the input event (which was detected at terminal device 715). For example, the mobile application can include event replicator 760. Event replicator 760 can include executable code or a set of operations that perform the function of replicating an input event. Further, event replicator 760 can be executed by the SDK embedded in the mobile application. In some instances, event replicator 760 can retrieve the selection data received at network device 705, and perform the function of replicating the input event as if the input event had occurred at network device 705. For example, if the selection data includes a set of coordinates of the location of click 750, then event replicator 760 can replicate click 750 on network device 705 as if the user operating network device 705 manually performed click 750. In this example, event replicator 760 can replicate click 750 on network device 705 at the same screen location as click 750 based on the set of coordinates included in the selection data. The set of coordinates can be transformed to the screen dimension of the network device, which may have a different screen dimension than the terminal device.

Figure 8:
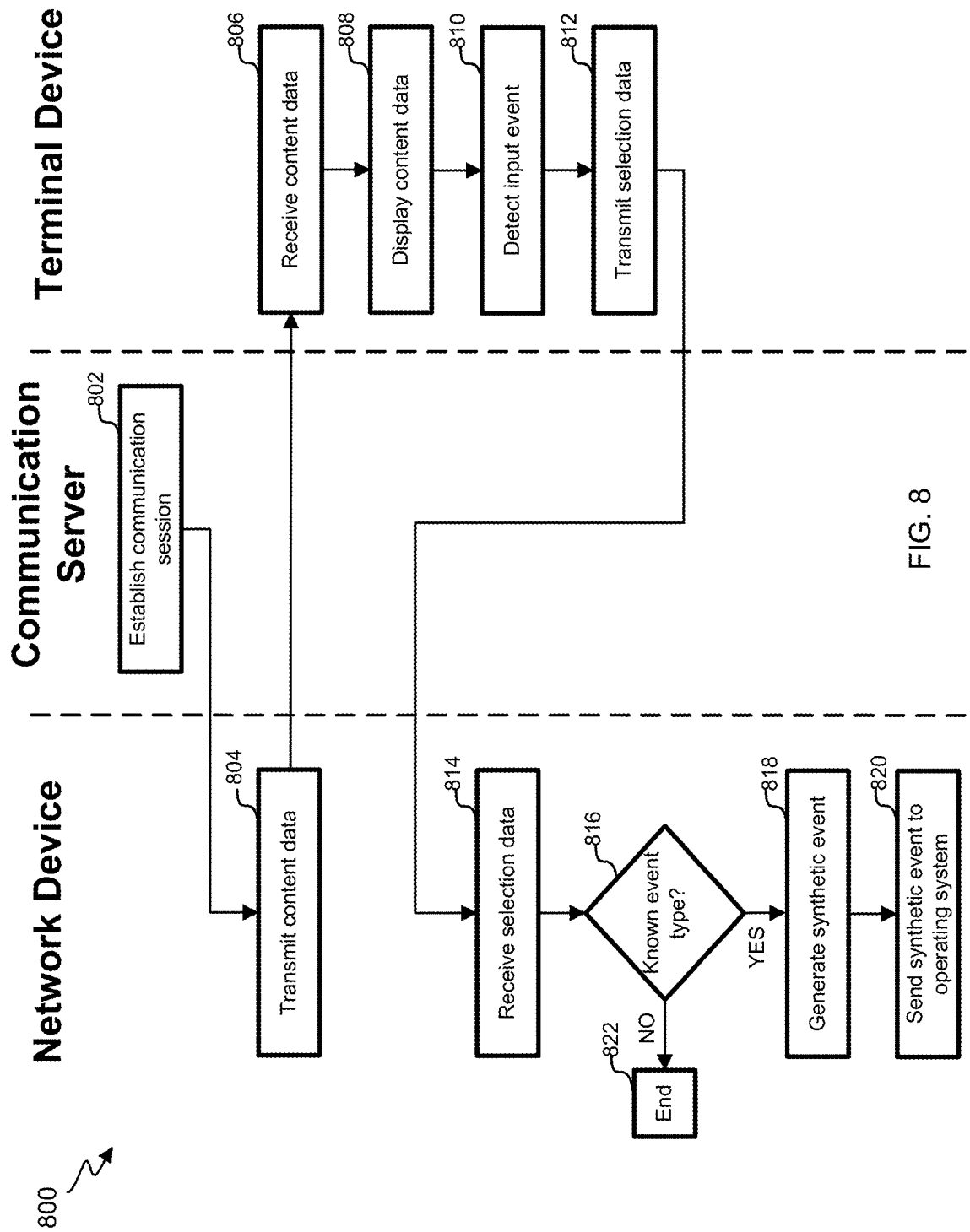
FIG. 8 shows a swim lane diagram of a process for replicating input events at a network device.

Event replicator 760 can replicate the detected input event using different processes depending on the operating system of network device 705. For operating systems that support dispatching synthetic events (e.g., replicated events) on an application programming level, input events can be replicated using programmatically-generated synthetic events on network device 705 to replicate remotely-generated input events (e.g., click 750 generated at terminal device 715). FIG. 8 further describes the processes for replicating remotely-generated events on operating systems that support dispatching synthetic events. For example, Android operating systems support dispatching synthetic events that were generated on a remote device. In some instances, the synthetic events are trusted for these operating systems (e.g., Android), and the synthetic events trigger the same defined action as if the user operating network device 705 had performed the input event (e.g., tapped or clicked).

For operating systems without support for dispatching synthetic events, remotely-generated input events may not be trusted by the operating system. Without support for dispatching synthetic events (e.g., remotely-generated mouse clicks), input events generated at terminal device 715 may not be replicated at network device 705. For example, the iOS platform and operating system does not support dispatching synthetic events. However, according to embodiments of the present disclosure, FIG. 9 describes the processes for mimicking or replicating remotely-generated events at network device 705 to achieve remote control capabilities during the communication session.

In some instances, a user navigating a mobile application executing on network device 705 can initiate the establishment of a communication session with an agent operating terminal device 715. During the communication session, terminal device 715 can remotely control the mobile application executing on network device 705. However, privacy is a major concern because the agent can view a real-time video or image of the mobile application running on network device 705. According to embodiments of the present disclosure, the mobile application can mask input elements that contain sensitive information so that the agent cannot view the sensitive information included in the input field.

In some instances, one or more input elements can be marked as a sensitive data field in the program code of the mobile application. For example, the program code of the mobile application can include a flag code or metadata that is associated with certain input fields. The existence of the flag code or the metadata in association with an input field can indicate that the input field is configured to receive sensitive data (e.g., the user's yearly salary, social security number, and the like). As another example, an input element included in the mobile application can be marked by using drop-in classes of input elements (e.g., a text field) that are provided by the SDK. Further, when the mobile application is executing, the mobile application can monitor the page of the mobile application that is being viewed by the user operating network device 705. Each page of the mobile application can be associated with a hierarchy of one or more input elements. For example, if the mobile application includes two different pages, the first page can be associated with a hierarchy of first input elements that are included on the first page, and the second page can be associated with a hierarchy of second input elements that are included on the second page. In this example, if the second page included a pre-flagged sensitive input element, and if the second page is currently being viewed on network device 705, the SDK can identify that the sensitive input element is being viewed. In some instances, the SDK included in the mobile application can monitor the page being viewed to determine the occurrence of a sensitive input element being viewed.

Continuing with the example above, when the second page is viewed, the content capture engine (e.g., content capture engine 765) captures the content of the second page. For example, the content capture engine can capture a screenshot of the second page. Further, the SDK can identify that a screenshot of a sensitive input element has been captured, and accordingly, the SDK can execute a privacy protocol for masking the sensitive input element before the screenshot is down-sampled and transmitted to the communication server. For example, the privacy protocol can search for the sensitive input element on the captured screenshot and determine the location and boundary (e.g., coordinates of the corners of the input element) of the sensitive input element. Further, the privacy protocol uses the determined location and boundary to determine which areas to mask. For example, the privacy protocol can include a painting algorithm that replaces each pixel within the boundary of the sensitive input element with a replacement color or pattern (e.g., a black pixel resulting in a black rectangle where the sensitive input element is located). The screenshot with the masked area can then be encoded (e.g., using WebRTC protocols), so that when the screenshot is reproduced on terminal device 715 as content 740, the reproduced screenshot includes the masked areas. Thus, the agent is prevented from viewing the original data included in the sensitive input element, however, the sensitive input element is not blocked while the user is viewing the page of the mobile application. In some examples, a privacy protocol can be a set of instructions for securing communications between the user and the agent. For example, the privacy protocol can be configured to mask sensitive data included in input elements presented in the mobile application. As another example, the privacy protocol can be configured to display an input element, but prevent the agent from manipulating any content data included in the displayed input element.

It will be appreciated that the privacy protocol can additionally limit the real-time screen sharing during the communication session to the mobile application. For example, the communication session can only facilitate the real-time screen sharing of the network device screen while the mobile application is being executed. When the mobile application is terminated (e.g., the application is closed), the communication session ceases, and the agent can no longer view the real-time screen content of the network device. Further, if the mobile application is still executing, but as a background process, the agent will only see black pixels as content 740. The agent can see the real-time screen content of the network device again when the mobile application is no longer running in the background. In addition, the privacy protocol, when executed, can limit the real-time screen sharing to only a subset of pages of all of the pages included in the mobile application. It will also be appreciated that the privacy protocol can prevent input (both "read" and "write") on certain input elements in the mobile application. For example, if a particular input element is flagged (e.g., associated with a flag code that indicates the blocking of read and write functionality), then the agent will be prevented from controlling that particular input element. For example, the agent will be prevented from selecting that input element and entering text characters.

In some instances, an unauthorized device (e.g., a hacker device) may seek to gain access to the remote-control capabilities of the communication session. The communication server can store identifiers of the communication session, the network device, the terminal device, and so on. If the communication server determines that an unknown device (e.g., a device without a corresponding identifier) has joined the communication session, the communication server can terminate the communication session or kick out the unknown device from the communication session. In some instances, if the user operating the network device determines that an unauthorized device has gained access to the remote-control capabilities of the communication session (e.g., a hacker is remotely controlling the mobile application executing on the network device), the communication session can easily be terminated. For example, the user can simply select the "home" button (e.g., or any button that populates a main menu on the network device) to terminate the communication session. In other instances, the user can restart the network device, or terminate the mobile application to terminate or end the communication session (and accordingly, terminate the remote-control capabilities associated with the communication session).

It will be appreciated that video and voice channels can be incorporated into the communication session between network device 705 and terminal device 715. For example, if a video channel capability is incorporated into the communication channel for real-time screen sharing, then an overlay element may be displayed on each of the network device and the terminal device. For example, the overlay element can include the video feed. In this example, the network device would include an overlay element displayed over the mobile application, and the terminal device would include an overlay element displayed over the web browser or web application. The content capture engine of the network device would not capture the overlay element displayed on the screen of the mobile application so as to avoid capturing screenshots of the agent. Further, the bandwidth of the transmitted data stream can be reduced by preventing the overlay elements from being captured by the content capture engine. It will also be appreciated that the SDK embedded in the mobile application that is executing on the network device can also include an event listener, and the terminal device can include an event replicator. For example, if a user taps an area of the screen within the mobile application that does not correspond to an input element, the user's tap can be detected at the event listener of the SDK and visually replicated (e.g., by a circle that is displayed for a short duration) at the terminal device. This allows the agent to visually determine where the user is tapping on the mobile application.

In some examples, the agent can notify the user's mobile device while the mobile application is not currently running (e.g., in standby mode). When the user accepts an initial audio call, the agent can perform one or more of several types of additional invitations. For example, the agent can continue to speak with the user on the audio call, the agent can transmit an invitation for an audio-video communication session (in which case, if the user accepts, the user can speak with and visually see the agent, and vice versa), and/or the agent can transmit an invitation for an audio call and a controllable communication session where the agent can remotely control the mobile application running on the mobile device. When the mobile application is not currently running at the time the agent calls, the mobile application can be configured to display a push notification on the mobile device, so that when the push notification message is selected, the mobile application can start running on the mobile device. In some examples, selecting the push notification message can automatically cause the controllable communication session to initiate. In some examples, when the user selects the push notification message, which is displayed on the screen of the mobile device, for example, additional information may be requested from the user (e.g., name, phone number, permissions, and other suitable information). In some examples, a push notification may not be presented, but rather, the controllable communication session may automatically initiate on the user's mobile device.

In some examples, communication can escalate to various levels while an agent is communicating with a user. For example, the user may be communicating with an agent in a chat session (e.g., the user may be using the user's desktop or the user's mobile device). If the user requests additional help, the agent can call the user's mobile phone directly from the agent's interface. When the user's mobile device receives the agent's audio call, the audio call may cause a push notification to be presented on the mobile device. For example, the push notification may indicate that selecting the push notification may initiate an audio call, an audio/video call, and/or a controllable communication session where the agent can remotely control the user's use of the mobile application. If an audio/video call is initiated, then the agent and the user can communicate visually. For example, the agent's interface may display the video feed of the user's camera on the mobile device. As another example, the user can provide permission to share the back-facing camera of the mobile device with the agent. The communication session can elevate to another type of communication. Continuing with the example above, the agent can send an invitation to join a controllable communication session to the mobile device during the audio/video call. On the user's mobile device, a notification can be presented to the user, which enables the user to accept the invitation to join the controllable communication session. After accepting, for example, the context capture engine begins to capture screen shots of the user's mobile device (which is executing the mobile application) and the event replicator begins replicating any events detected at the agent's device. The contents of the screen of the mobile application can be displayed on the agent's interface in addition to or in lieu of the video feed received from the user's mobile device. In this example, the several levels included the audio call, the audio/visual call, and the controllable communication session.

It will be appreciated that the agent operating the terminal device may be controlled by a bot script instead of a human. For example, a user may communicate with an agent that is controlled by a computer program (e.g., a bot agent) and that is configured to replay a previously recorded set of instructions (e.g., predefined text elements, videos, illustrations, and so on) to visually illustrate to the user how to perform certain steps in the mobile application. In some examples, a human agent may hand over the controllable communication session to a bot agent, which can then execute a pre-recorded set of responses and/or videos during the communication session. In some examples, the human agent can retake control of the controllable communication session at any time, or the bot agent may be configured to automatically hand back control of the controllable communication session (e.g., where the mobile application of the user's mobile device is remotely controlled by an agent) to the human agent. In these examples, the bot agent can work in combination with the human agent.

It will also be appreciated that an input element displayed when the mobile application is running (during the controllable communication session) on the user's mobile device may be selected by clicking (either by the agent remotely or by the user directly) within the pixel boundary of the input field (e.g., within the text box). However, selecting input element is not limited to clicking or tapping within the pixel boundary of the input element (e.g., within the text box). Input elements may be selected in other ways, for example, by implementing a unique identifier associated with each input element. For example, programmatically, the agent can identify an input element using the identifier associated with the input element, and then transmit the content that the agent intends to fill in the input element. In this example, if the agent communicating with the user is a bot agent, the bot agent does not need to analyze the screen shots of the user's screen to select an input element (e.g., by clicking), but rather, the bot agent can identify the input element using the identifier of the input element (e.g., "user_name"). Further, in this example, a bot agent does not need to detect the location of input elements on the screen, but instead, the bot agent is configured to access the identifiers of the input elements and can select an input element using the input element's identifier. When the user's mobile device receives the data representing the input element selected by the bot agent, the mobile application would then select the input element by referencing the identifier received from the bot agent. The mobile application already has access to the pixel boundary of the selected input element, and thus, the bot agent would not need to transmit the coordinates for an input event (e.g., a click), but instead, the bot agent can transmit the identifier of the selected input element and the content to fill in the input element.

While the above description includes displaying field masks to mask input elements that include sensitive information, another security measure may include presenting the input element without masking the content of the input element, but preventing manipulation of the content data that is included in the input element. For example, the user can enter text into an input element, but the agent cannot, while the input element is not masked from the agent's view.

FIG. 8 shows a swim lane diagram of process 800 for replicating input events in operating systems with support for dispatching synthetic events. Process 800 can include interactions between a network device (e.g., network device 705), a communication server (e.g., communication server 710), and a terminal device (e.g., terminal device 715). Further, process 800 can be performed to receive an input event (remotely generated at a terminal device) and replicate the input event at a network device. The operating system of the network device in process 800 can support the replication of synthetic events (e.g., an input event generated at another device). For example, the network device involved in process 800 can be executing an Android operating system.

Process 800 begins at block 802 where the communication server establishes a communication session between the network device associated with the user and the terminal device associated with the agent. In some instances, the communication session can be established in response to selection of a button presented by the mobile application on the network device. For example, selection of the button (e.g., by the user) in the mobile application can cause the communication session to be established. It will be appreciated that other methods (described herein) can be used to initiate the communication session.

In some instances, the communication session can be established using a session identifier generated and stored at the communication server. For example, the user can retrieve the session identifier using the network device. Upon request by the terminal device, the user can provide the session identifier, which, when accepted, can initiate the establishment of the communication session. The session identifier can be an alphanumeric string of characters provided manually by the user or automatically by the network device. In some instances, the agent and the user can be exchanging messages, for example, using a messaging server. The messages can exchanged using asynchronous communication (e.g., where delays of several minutes, hours, or days between messages are acceptable). For example, an asynchronous exchange can include an electronic message exchange (e.g., via an app, web-based message/inbox system, or email) distinct from instant messaging or a chat. An asynchronous exchange can include communicating messages in a manner such that a transmitted message is stored in a message queue or inbox until a destination device (e.g., the network device, the terminal device, or the recipient of the message) requests that the message be presented or is visiting a webpage or app page corresponding to the queue or inbox. In this example, one of the messages in the asynchronous communication between the network device and the terminal device can include an invitation to join the communication session. The user can accept or deny the invitation included in the message. Upon accepting the invitation, the communication session can be established between the network device and the terminal device.

In some instances, a messaging session between the agent and the user can be considered an asynchronous message exchange, where interactions occur in irregular intervals between participants. Messaging conversations can help provide context or additional information to users who are experiencing issues with a mobile application. However, in some instances, messaging conversations offer limited issue resolution. In these instances, a messaging conversation between a user and an agent can be elevated to a communication session for real-time screen sharing with simultaneous remote-control capabilities. For example, the communication can be initiated when an invitation message is transmitted to the user by an agent. The agent can select a set of capabilities that the agent proposes to implement in the communication session. For example, capabilities can include remote-application control, real-time screen sharing, video and voice transmission, and other suitable capabilities. The user can accept or deny the set of capabilities. In some instances, capabilities may be mandatory, and if not accepted by a user, then the communication session would not be established. In other instances, capabilities may be optional, such that if rejected by the user, the real-time communication session is still established. Further, the capabilities can be adjusted or modified at any time during the communication session. It will be appreciated that the capabilities can include any combination of bi-direction voice or video transmission, unilateral voice or video transmission, augmented reality imposed onto a camera feed of the network device, and other suitable capabilities.

In some instances, if the communication session is unexpectedly terminated, the mobile application can include functions to re-establish the terminated communication session or re-connect the network device with the same terminal device. For example, when the communication session is terminated, the user can reboot the mobile application executing on the network device. When rebooted, the mobile application can present the option to re-establish the communication session. When an acceptance of the option is received at the network device, the communication session can be re-established. Re-establishing the communication session can include notifying the same terminal device that the mobile application executing on the network device has been rebooted. Further, the same terminal device (e.g., the same agent) can re-join the communication session and continue with the remote-control of the mobile application. Advantageously, when the communication has been terminated, the terminal device can no longer view the real-time content displayed or captured at the network device.

According to embodiments of the present disclosure can include security features to ensure that the computing device that has joined the re-established communication session is the same terminal device that previously was involved in the communication prior to the termination of the communication session. For example, the communication server can store identifiers of the communication session and device identifiers of the network device and the terminal device. The identifiers of the communication sessions can uniquely identify a communication session from all of the other communication sessions. If the terminal device that joins the re-established communication session is different from the terminal device that was originally included in the communication session prior to the unexpected termination, then the communication server can identify that the terminal device that joined the re-established communication session has a different device identifier from the original terminal device. The communication session can then notify the network device that the terminal device that joined the re-established communication session is different from the original terminal device. The notification can enable the user operating the network device to terminate the communication or wait until the original terminal device joins the re-established communication session and block the newly joining terminal device. In some instances, the mobile application can determine the device identifiers (e.g., MAC address) of the terminal device when the communication session is established. If at any time during the communication session, the device identifier of the terminal device is different from the original device identifier, the network device can be notified and provided with the option to terminate the communication session or wait for the original terminal device to re-join the communication session.

At block 804, during the communication session, the network device can capture content present by the mobile application, and the network device can transmit the captured content as content data in a data stream. The network device can transmit the content data to the communication server, which can then forward the content data to the terminal device. Examples of the content data can include images or a portion of an image presented by the mobile application, screenshots periodically captured of the current state of the mobile application presented on the network device, video data or video frames of the currently presented page of the mobile application, audio data, or metadata associated with the current page being presented by the mobile application, and other suitable content data. The content data can be continuously captured while the mobile application is being executed. Once the application is closed (e.g., terminated) or becomes a background process, the periodic capturing of the content data (e.g., screenshots) can be suspended. When the mobile application resumes, then the mobile application can continue to periodically capture screenshots of the screens of the mobile application.

At block 806, the terminal device can receive the content data from the communication server. For example, the content data can be included in a data stream that is transmitted to the terminal device. In this example, the data stream can be generated by encoding the continuously captured screenshots of the mobile application. As only a non-limiting example, the encoding of the captured screenshots can be achieved using WebRTC protocols. Other real-time communication protocols can be used to encode the content data. Once the data stream has been received at the terminal device, the data stream can be permanently or temporarily stored in the terminal device. Further, the content data can be extracted from the data stream, and then the content data can be processed.

At block 808, the content data can be displayed at the terminal device. For example, when the content data is a video frame of the interface of the mobile application, the terminal device can display a real-time video frame on a screen of the terminal device. In this example, the terminal device can display the most recently received video frame. As new video frames are received at the terminal device, the new video frame can displayed on the terminal device. When a succession of video frames is displayed, the succession of the video frames mimics a video. For example, as illustrated in FIG. 7, content 740 can be a screenshot of the mobile application. Further, content 740 can be continuously updated with the most recently captured screenshot, thereby enabling the terminal device to display the mobile application as it is presented on the network device in real time.

At block 810, the event listener that is running on the web browser of the terminal device can listen (e.g., detect) for input events performed at the terminal device. For example, the event listener can detect whether the agent has selected (e.g., tapped, double tapped, clicked, double clicked, swiped, and so on) any area of the content data displayed on the terminal device. In this example, if the terminal device displays real-time video frames of the interface presented on the network device, the event listener can detect whether the agent has selected (e.g., clicked) any area of the displayed video frames (e.g., whether the agents clicks any area of content 740).

At block 812, the terminal device can generate the selection data based on the detected input event, and then transmit the selection data. The terminal device can transmit the selection data to the communication server during the communication session, and the communication server can then forward the selection data to the network device. The selection data can be associated with the selection at the terminal device. For example, the selection data can include a set of coordinates of the input event. In this example, if the input event is a click of a mouse pointer on content 740 detected at the terminal device, the coordinates of the click can be determined. Further, the coordinates of the click can be included in the selection data. The selection data may not be limited to the coordinates of the input event, but may include other data, such as metadata associated with the selection detected at the terminal device.

At block 814, the network device can receive the selection data (by way of the communication server) during the communication session. In some instances, the selection data can include the coordinates of the selection at the terminal device and the type of the input event. Examples of types of input events can include clicks, swipes, taps, double taps, and other suitable types of input events. At block 816, the network device executing the mobile application can determine whether the input event type included by the selection data is known (e.g., predefined). For example, the mobile application can be configured to replicate input events of certain types. If the input event is not of a predefined type, then the detected input event can be discarded and process 800 can proceed to block 822 ("NO" at block 816) where process 800 ends. Determining whether the input event type included in the selection data is of a predefined type can include comparing an identifier of the input event type against a predefined list of input event types. For example, the input event type can be associated with an identifier, and the list of predefined input event types can be accessible to the operating system of the network device. In this example, the network device can retrieve the list of predefined input event types, and compare the received input event type against the list. In some instances, the predefined list of input event types can be included in the program code of the mobile application. Further, as an example, the predefined list of input event types can include a list of all of the various types of input element types included in the one or more pages of the mobile application. For example, the mobile application can include one page, which includes a radio button input element, a text field input element, and a drop-down menu input element. In this example, the predefined list of known input element types can include a list of a radio button input element type, a text field input element type, and a drop-down menu input element type. If the input element type is known (e.g., "YES" at block 816), then process 800 proceeds to block 818.

At block 818, the mobile application can generate a synthetic event based on the selection data. In some instances, a synthetic event can include an input event that is generated at a remote device (e.g., terminal device) and replicated at a local device (e.g., network device). For example, if the agent clicks within the area of content 740, the click can be detected as an input event. The input event can be replicated as a synthetic event at the network device because the input event was generated at the terminal device, which is remote to the network device. Further, a synthetic event can include an input event performed at the network device that is not based on an interaction of the user operating the network event. Instead, the input event that is performed at the network device is based on a remotely-generated input event detected at the terminal device. In some instances, an input event can include a serialized data structure, and can be transmitted from the terminal device to the network device using websockets as the transport protocol.

Generating the synthetic event can include matching the mobile event structure of the received input event, and filling the event structure with the provided event data (e.g., a touch location). For example, if the input event included in the selection data corresponds to the selection of a radio button, the input event can include an event structure that corresponds to a radio button. Further, the selection data can also include event data that corresponds to the input event. For example, the event data can include the location of the selection at the terminal device. In this example, the event data can include the coordinates of the touch or click location at the terminal device. When the network device receives the input event, the SDK embedded in the mobile application can generate an event structure that matches the event structure of the received input element (e.g., the event structure corresponding to the radio button). Further, the SDK embedded in the mobile application can fill in the generated event structure with the event data (e.g., the touch location) associated with the received input element. By generating an event structure that matches the received input element, and by filling in the generated event structure with the event data of the received input element, the synthetic event can be generated at the network device based on the input event detected at the terminal device. At block 820, the generated event structure including the event data (e.g., touch location) can be transmitted to the operating system of the network device. Because the operating system of the network device in process 800 supports dispatching of synthetic—programmatically created events—the remotely-generated input events (e.g., Android) can be replicated in a way that results in the operating system automatically performing all subsequent steps (default actions) associated with the input event, as if it would for an actual user input (e.g., a tap on the screen by the user). For example, if the input event is a selection of a location on content 740 at terminal device 715, that selection can be performed remotely at network device 705 by creating a synthetic event at the network device that matches the input event generated at the terminal device.

Figure 9:
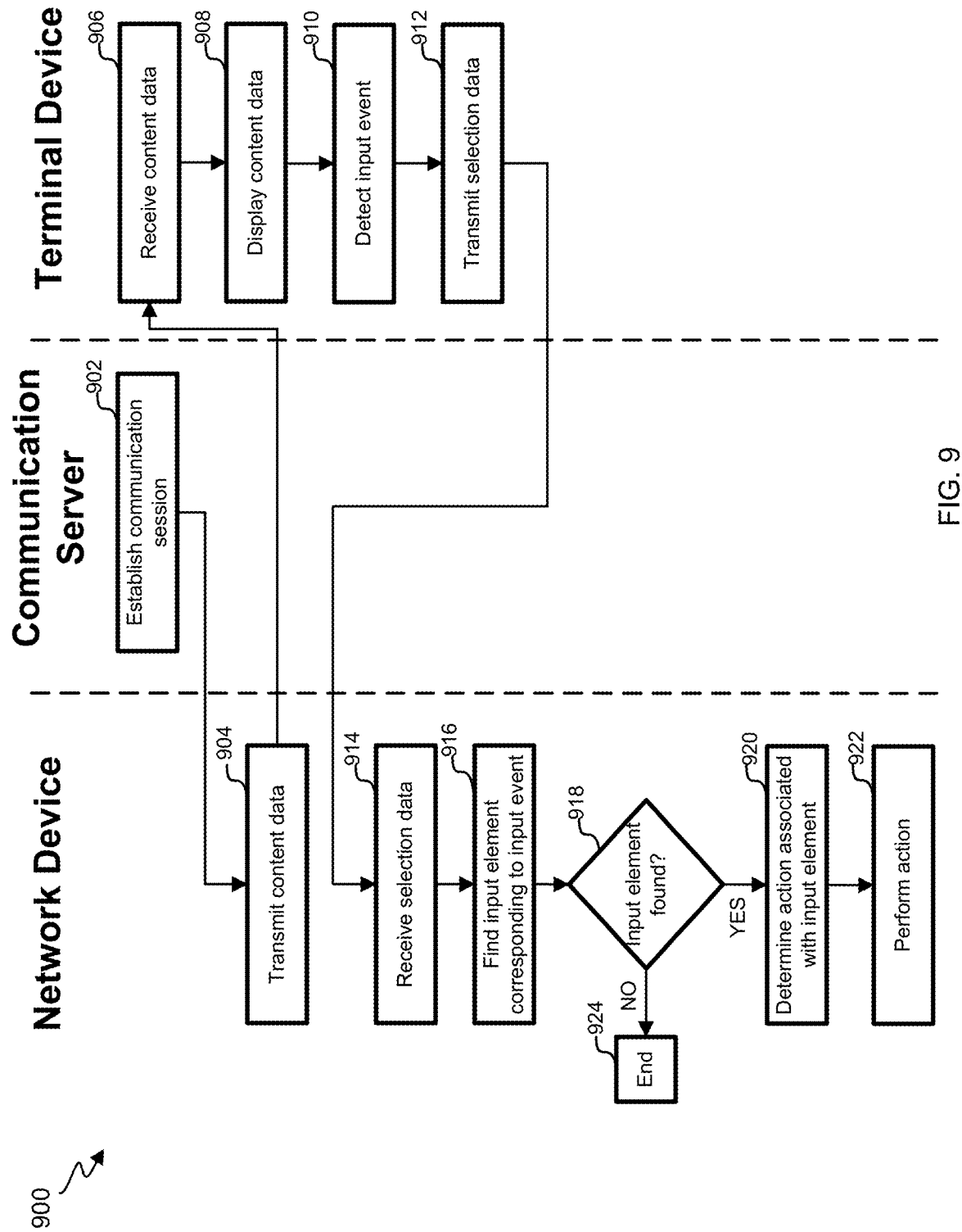
FIG. 9 shows a swim lane diagram of another process for replicating input events at a network device.

FIG. 9 is a swim lane diagram of process 900 for replicating input events in operating systems without support for dispatching synthetic events. Process 900 can include interactions between a network device (e.g., network device 705), a communication server (e.g., communication server 710), and a terminal device (e.g., terminal device 715). Further, process 900 can be performed to receive an input event (remotely generated at a terminal device) and replicate the input event at a network device (e.g., using event replicator 760). However, the operating system of the network device in process 900 does not support the dispatching of synthetic events (e.g., an input event generated at another device). In some instances, operating systems without support for dispatching synthetic events are restricted from providing programmatic access to mobile generation of input events, and therefore, do not directly support replication of events generated at a remote device. For example, an operating system without support for dispatching synthetic events, and therefore, without direct support for replicating synthetic events is the iOS operating system. Process 900 is performed to mimic the remotely-generated input event to enable remote-control capabilities during the communication session. Further, blocks 902 through 914 of process 900 are similar to blocks 802 through 814 of process 800, and thus, descriptions of blocks 902 through 914 are omitted here.

At block 916, the mobile application that is running on the network device can execute a search algorithm to find a target input element of a current page presented by the mobile application. A target input element can be an input element that corresponds to the remotely-generated input event. For example, the search algorithm is used to find the first input element (of all of the input elements that are displayed on a current page of the mobile application) that satisfies one or more rules. Examples of the one or more rules can include an operation for determining whether the input element is known to the SDK embedded in the mobile application (e.g., a predefined input element as described above in the present disclosure), an operation for determining whether the input event's coordinates are within the boundary of an input element displayed on the current page of the mobile application, an operation for determining whether the found input element (e.g., the target input element) is enabled and ready to receive input, and other suitable rules. If an input element displayed on a current page of the mobile applications satisfies any rule or any combination of the one or more rules, then the input element can be the target input element.

In some instances, the search algorithm can include one or more operations for locating a target input element on a current page presented by the mobile application on the network device. For example, the one or more operations can include receiving the remotely-generated input event and the associated event data (e.g., touch or click location) of the input event. In this example, the selection data received at the network device (e.g., at block 914) can include the remotely-generated input event and the associated event data. Further, the one or more operations can include determining the coordinates of the click location that was performed by the agent at the terminal device (e.g., P=event x, event y). A root element can then be set. For example, a root element can include the particular page of the mobile application that is being viewed on the network device at a current time. Setting a root element can correspond to identifying the particular page being viewed at the network device at a current time. The root element can have one or more child elements. For example, a child element can be an input element on a particular page presented by the mobile application. As a further example, since the root element can correspond to a particular page of the mobile application, a child element can correspond to an input element that is included on that particular page.

Further, the one or more operations can include comparing the coordinates of the click location (e.g., P=event x, event y) with the input boundary for each child element associated with the root element. For example, the SDK embedded in the mobile application can determine, iteratively for each child element of a root element, whether the coordinates of the click location intersect the input boundary of the child element. In this example, the SDK can identify the root element and then retrieve the data representing the input boundary for each child element. Then, the SDK can compare the coordinates of the click location to each of the retrieved input boundaries. In some instances, when the input element is in the shape of a rectangle, the data representing the input boundary can include the pixel location at the top, left of the rectangle and the pixel location at the bottom, right of the rectangle.

At block 918, the mobile application can determine whether the target input element was found. Finding the target input element can correspond to determining that the coordinates of the click location intersect the input boundary of an input element (e.g., the click location is within the area of the input boundary). When the target input element has been found (e.g., "YES" out of block 918), then process 900 proceeds to block 920 where the defined action associated with the target input element is determined. Each input element can have an associated action and an input boundary. Examples of actions associated with an input element can include selecting buttons, toggling the state switches (checked vs. non-checked), segmented controls, adding or deleting characters in a text field or text area, triggering scroll elements, and other suitable actions. When the target input element has been identified, the SDK included in the mobile application can retrieve the defined action of the event corresponding to the type of the target input element. At block 922, the defined action can be performed by the mobile application. For example, performing the defined action can mimic the process of a mobile input event (e.g., an input event executed locally at the network device, instead of the terminal device), so that the input event generated at the terminal device can seamlessly be replicated at the network device to control the input elements of the mobile application. When the target input has not been found (e.g., "NO" out of block 918), then process 900 proceeds to block 924 where process 900 ends.

In some instances, certain input elements, such as text fields or text areas, support complex input operations (e.g., copy, paste, multi-character deletes, line breaks, and so on). It will be appreciated that process 900 can also support these complex operations. In these instances, process 900 can facilitate the dynamic or on-demand replication of input element so that input elements are dynamically replicated on the terminal device as needed. For example, if the target input element is determined to be a text field (e.g., at block 920), the network device can notify the terminal device that the target input element is a text field. Further, the network device can also transmit the current contents of the text field together with or separately from the notification message to the terminal device. When the terminal device receives the notification message and the current contents of the text field, the terminal device can generate an overlay element to display on top of the real-time screenshot images (e.g., the overlay element would be displayed on top of content 740). In some instances, the overlay element can be generated so that it is positioned on top of the image portion of content 740 that corresponds to the text field. Because content 740 includes image or video data and is flat, non-structural data, the agent would not ordinarily be able to type text into a text field. However, the overlay element that is generated at the terminal device (e.g., generated by the web application or the web browser) can be displayed over the image portion of content 740 that would correspond to the text field, and can be configured to receive text data from the agent. For example, the overlay element can include a text box into which the agent can type character letters.

In some instances, each letter typed by the agent is transmitted back to the network device using the communication server. In other instances, the entire text string is transmitted to the network device when the agent has completed entering text. When the network device receives the entered characters or character string from the terminal device, the mobile application updates the input value of the text field so that the text field populates the updated text, which was modified by the agent. In some instances, the text entered into the overlay element by the agent at the terminal device can be appended to the original text included in the text field. In these instances, the defined action of the text field can be the populating of the text included in the input value of the text field. For example, the input value associated with the text field can be the original text to be populated that was coded in the program code of the mobile application. When the agent is typing into the overlay element, the agent can add letters, delete letters of the text originally included in the text field, move cursor positions within the text field, highlight text, change formatting aspects of the text (bold, italics, underlined, and so on), and other suitable modifications to text.

Figure 10:
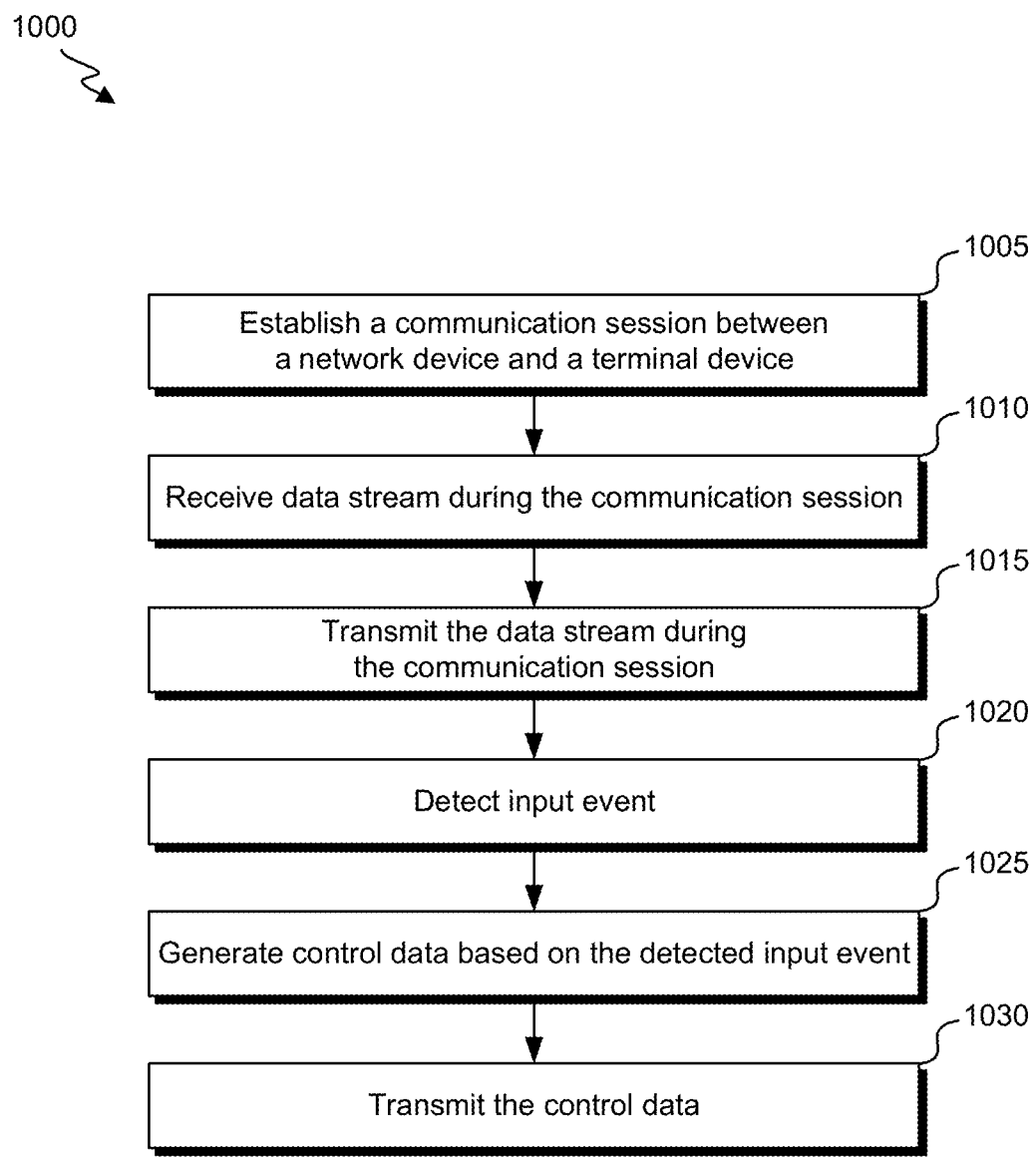
FIG. 10 shows a flowchart of a process for remotely controlling mobile applications.

FIG. 10 shows a flowchart of process 1000 for remotely controlling mobile applications. In some instances, process 1000 can be performed by a communication server (e.g., communication server 180, 710). Process 1000 can also be performed, at least in part, by a network device (e.g., network device 105, 705) or a terminal device (e.g., terminal device 115, 715). As an example, process 1000 can be performed to enable a terminal device to remotely control a mobile application that is executing on a network device (remote from the terminal device). Further, process 1000 can also establish a communication session between the network device and the terminal device, such that content presented by the mobile application on the network device can be shared in real-time with the terminal device.

The network device can be configured to execute a mobile application that can initiate the communication session. The mobile application can be remotely controlled by the terminal device. Further, the mobile application can include or present an input element at an initial state. In some instances, the initial state of an input element can be the state of the input element when the mobile application is executed. Examples of the initial state of an input element can be an empty text field, a text field with an initial set of characters (e.g., "Input text here"), an unselected radio button, and so on.

Process 1000 begins at block 1005 where the communication server establishes a communication session between the network device and the terminal device. The communication session can be established using any of the methods described herein. For example, as described above, the network device can request a service identifier from an application server (e.g., associated with the mobile application). Then, the network device can exchange the service identifier with the communication server for an invitation to join the communication session.

In some instances, the communication session for real-time content sharing can be established as a part of an existing communication session. For example, a communication session for asynchronous message exchange can be established between the network device and the terminal device. An asynchronous exchange can include, for example, an electronic message exchange (e.g., via an app, web-based message/inbox system, or email) distinct from instant messaging or a chat. An asynchronous exchange can include communicating messages in a manner such that a transmitted message is stored in a message queue or inbox until a destination device requests that the message be presented or is visiting a webpage or app page corresponding to the queue or inbox.

As part of an asynchronous message exchange between the network device and the terminal device, the terminal device can include an invitation in an outgoing message to the network device. The invitation can include data that causes an elevation of the existing communication session when accepted at the network device. Elevating an existing communication session can include establishing an additional communication session as part of the existing communication session. For example, the additional communication session can be presented as an additional window displayed on the mobile application or on the network device. As another example, the existing asynchronous communications session can be converted into the additional communication session. In this example, the additional communication session can be presented in the same window as the asynchronous communication session. Further, the content presented on the screen of the network device (while the mobile application is executing) can be displayed in the window of the additional communication session.

In some instances, the additional communication session can also be established using another device associated with the network device. For example, the asynchronous message exchange can be established between the terminal device and a desktop computer operated by the user. In this example, the terminal device can transmit an asynchronous message including an invitation to join the additional communication session for real-time screen sharing of the content presented by the mobile application. In some instances, the user can accept the invitation using a smartphone or tablet device associated with the user. In other instances, the user can accept the invitation using the desktop computer and accept the communication session using the user's smartphone. The additional communication session can be established between the terminal device and the smartphone or tablet device associated with the user. For example, the content presented by the mobile application executing on the smartphone or captured (e.g., audio or video signals) at the smartphone can be displayed in real-time on the terminal device. It will be appreciated that switching devices during a communication session (e.g., from the desktop to the smartphone) may maintain the state of the chat messages between the agent and the user. For example, if the user switches from the desktop to the user's mobile device, the user will be able to pick up from the same place in the conversation with the agent. It will also be appreciated that the agent can remotely control the mobile device and/or mobile application running on the mobile device for the purpose of determining and evaluating diagnostics of the mobile device.

At block 1010, the communication server can receive a data stream during the communication session. The data stream can be received from the network device. In some instances, the data stream can be generated using a real-time communication protocol. As a non-limiting example, the WebRTC protocol can be used to encode the video frames of the content captured at the network device. For example, the WebRTC protocol can be used to down-sample a sequence of video frames captured of a screen presented by the mobile application executing on the network device. The down-sampled video frames can be processed to generate a data stream at the network device.

In some instances, the data stream can include content data captured at the network device. Content data can include any data captured by the content capture engine at the network device. In some instances, the content data can include any data that is captured at the network device while the mobile application is executing. Examples of content data can include an image or screenshot of a page presented by the mobile application, a video frame of a video presented by the mobile application, video data (e.g., a video frame) of a video feed captured by the camera of the network device, audio data of an audio signal captured by a microphone of the network device, and other suitable media streams or content data.

For example, the content data can include an object presented by the mobile application. In some instances, the object can be a portion of the image or screenshot captured at the network device. For example, the object included in the content data can correspond to the input element included in the mobile application. In this example, when the input element at an initial state is an empty text field, the object can be the portion of the screenshot that represents the empty text field. Further, in this example, the object can include the portion of the screenshot that includes the empty text box of the text field. For example, in this case, the object is not the input element, but rather the image portion of the screenshot that represents the input element. It will be appreciated that the data stream received at the terminal device can be visual feedback data (e.g., video frames of the video captured at the network device) of the content presented by the mobile application executing on the network device. The visual feedback data received at the terminal device does not include the structure of the mobile application (e.g., the number of type of input elements on a page), but rather only includes images of the structure. In this case, the structure of the mobile application includes the hierarchy of input elements presented on a page of the mobile application. Further, the data stream received at the terminal device may or may not include any information identifying the operating system that is running on the network device. Advantageously, the embodiments set forth in the present disclosure enable the terminal device to control the mobile application executing on the network device regardless of the operating system running on the network device.

At block 1015, the communication server can transmit the data stream (received at block 1010) during the communication session. In some instances, the data stream can be transmitted to the terminal device. When the data stream is received at the terminal device, the content data that is included in the data stream can be displayed or outputted at the terminal device. For example, the content data can include video frames (successively captured) of the content presented by the mobile application. In this example, when the content data is received at the terminal device, the video frames can be displayed on a screen of the terminal device. Accordingly, the real-time video of the content presented by the mobile application executing on the network device can be displayed on the screen of the terminal device for viewing by the agent. In some instances, the content data can include content captured at the network device. For example, the content data can include audio captured at the microphone of the network device. In this example, the content data is included in the data stream, and when the data stream is received at the terminal device, the terminal device can output the content data (e.g., output the audio signal).

At block 1020, an input event can be detected. In some instances, the input event can be detected by the web browser operating on the terminal device. For example, the web browser can detect that an input event was generated at the terminal device (e.g., the agent clicked a mouse button). As another example, the web browser can receive input corresponding to a selection (e.g., click event, tap event, swipe event, and so on) on the displayed content (e.g., content 740). In other instances, the communication server can receive data representing the input event generated at the terminal device (e.g., data representing that a click event occurred). Further, the communication server can then detect that the received data corresponds to an input event performed at the terminal device. The input event can be detected in association with the content data. For example, the input event can be a click event, such that input corresponding to the click event on the displayed content (e.g., the click event detected within content 740). In some instances, the input event can be detected by the event listener of the mobile application (e.g., in situations where the user taps a location that is not an input element on a page presented by the mobile application).

At block 1025, the communication server can generate control data based on the detected input. For example, the coordinates of the detected input event (e.g., coordinates of the click event or tap event detected at the terminal device) can be included in the control data. Other information may be included in the control data, for example, metadata associated with the detected input, a time of the detected input event, a type of input event (e.g., click, tap, swipe), identifier(s) of the network device that is to receive the control data, identifier(s) of the terminal device on which the input event was detected, and other suitable information.

At block 1030, the communication server can transmit the control data to the network device. For example, the communication server can determine the identity of a destination to receive the control data. In some instances, the communication session can have a corresponding identifier. The identifier of the communication session can also identify the network device and the terminal device that are involved in the communication session. The communication server can extract the identifier from the metadata associated with the received or detected input event. The communication server can generate the control data and determine the destination of the control data using the extracted identifier. When the control data is received at the network device, the control data can modify the initial state of the input element included in the mobile application. For example, when the control data is received at the network device, the mobile application can process the control data. In this example, the SDK embedded in the network device can trigger the event replicator (e.g., event replicator 760) to replicate the detected input event. Replicating the detected input event using the control data can include any of processes 800 and 900 described above. Further, modifying the initial state of the input element presented by the mobile application can also include any of processes 800 and 900 described above. It will be appreciated that the control data can be generated at the terminal device.

Figure 11:
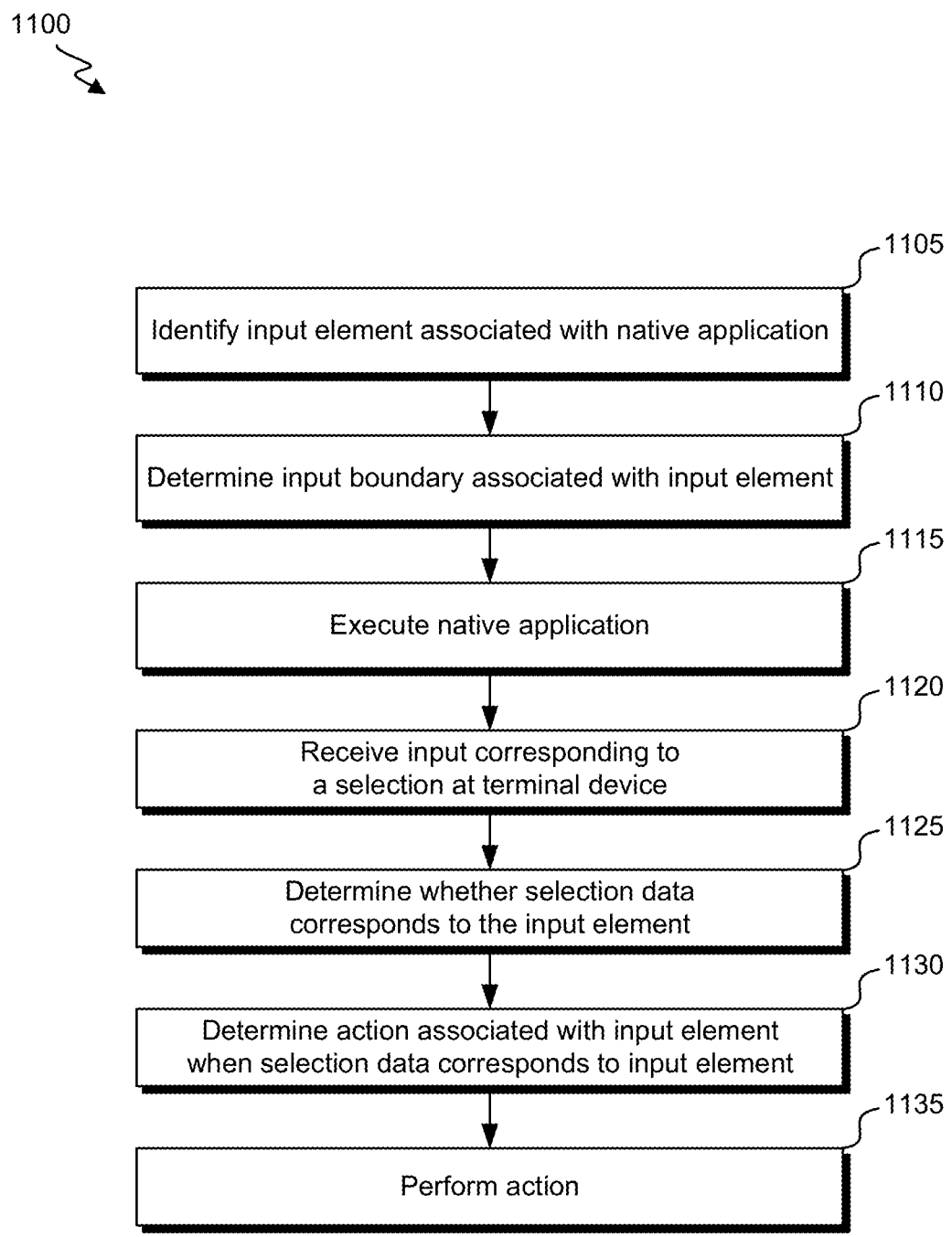
FIG. 11 shows a flowchart of a process for replicating input events at a network device.

FIG. 11 shows a flowchart of a process for replicating input events at a network device. Process 1100 can be performed by the network device. Further, process 1100 can be performed to replicate remotely-generated input events at a network device (e.g., using event replicator 760) for the operating systems that do not support the dispatching of synthetic events (e.g., iOS). Process 1100 begins at block 1105 where the network device can identify an input element included in the mobile application stored on the network device. For example, the program code of the mobile application can include a portion of code that identifies an input element. The program code can include code identifying a plurality of input elements. The input element can be configured to receive input data based on an interaction. For example, the input element can be a text field that is configured to receive text characters based on input corresponding to a selection of letters on a keyboard presented on the network device.

At block 1110, an input boundary corresponding to the input element can be determined. The input boundary can be an area presented on a page of the mobile application for receiving the input data associated with a particular input element. For example, if the input element included in the mobile application is a text field, the input boundary of the text field can be the text box into which the text characters can be inputted. In this example, the input boundary can be represented by the location of the pixel at the top-left of the text field box and the location of the pixel at the bottom-right of the text field box. A plurality of input elements can be presented by the mobile application.

At block 1115, the mobile application can be executed at the network device. Executing the network device can include booting the application on the network device. Further, executing the mobile application can include displaying the input element at an initial state. For example, the network device can receive input corresponding to a selection of an icon displayed on the network device. Selecting the icon can initiate booting the mobile application on the network device. When the mobile application is booted, the mobile application can present a page of a plurality of pages on the screen of the network device. Further, the page of the mobile application can include an input element (e.g., a text field for inputting text). In some instances, displaying the input element at the initial state can include displaying the input element with its initial input value or any previous input value. For example, the initial state of an input element can correspond to an unselected radio button, and unselected button, an empty text field, a text field with text (e.g., pre-populated or from initial input value as coded in the program code of the mobile application), and other suitable initial states. Further, the mobile application can be remotely controlled by a terminal device.

At block 1120, the network device can receive input corresponding to a selection at the terminal device. For example, when the terminal device receives input corresponding to an input event (e.g., a click event) on the displayed content area (e.g., content 740), the input event can be detected. Further, the terminal device can transmit the input event to the communication server using websockets. The communication server can transmit or relay the detected input event to the network device. The detect input event can be received at the network device as input. Further, the received input corresponds to the selection (e.g., click event) detected at the terminal device.

In some instances, the selection at the terminal device (e.g., the click event) can be associated with selection data. Selection data can include any data or metadata associated with the selection (e.g., click event) detected at the terminal device. Examples of selection data can include the pixel coordinates of the selection detected at the terminal device (e.g., coordinates on content 740 at the location of the click performed by the agent), data or metadata associated with the selection and detected by the event listener running on the web browser of the agent, data or metadata associated with processing of the click event (e.g., click 750, time of the click, duration of the click, whether the click or tap was a single click/tap or double click/tap or a click-drag operation, and so on), whether the click was a left-click or a right-click, and other suitable data. It will be appreciated that the input event detected at the terminal device can be any input event and is not limited to a click. For example, the input event at the terminal device can also be a swipe, a tap, click-drag operation, a multi-touch, a gesture of a wearable computing device associated with the terminal device, and the like. In some instances, the selection data can be used to identify a position associated with the mobile application. For example, if the selection data includes the coordinates of the input event detected at the terminal device (e.g., the coordinates of a click performed by the agent on content 740), the selection data when received at the network device can be used to identify the location of the input event on the screen of the network device (e.g., the position of the input event associated with the mobile application).

For example, if the input event detected at the terminal device is a click at location (x, y) on the screen of the terminal device, the selection data can include the location coordinates. When the network device receives the selection data, the network device can replicate the remotely-generated click at the corresponding location on the network device. For example, the network device can replicate the click at the location that corresponds to the location (x, y). It will be appreciated that the location (x, y) of the terminal device can be transformed or translated to a corresponding location (x', y') on the network device based on the dimensions of the screens of each device. For example, if the network device has a different screen size or orientation than the terminal device, the location (x, y) included in the selection data can be transformed into the corresponding location (x', y') on the network device. In some instances, the network device can perform the transformation of the location (x, y) when the selection data is received. In other instances, the communication server or the terminal device can perform the transformation of the coordinates.

At block 1125, the SDK embedded in the network device can determine whether the selection data corresponds to the input element. Determining whether the selection data corresponds to the input element can include identifying a root element (e.g., current page) of the mobile application and iteratively checking each child element (e.g., input element presented on the current page) to determine whether the coordinates of the selection are within the input boundary of the child element. For example, a root element can be the current page or specific page(s) of the mobile application at the time the input event is received at the network device. The root element can have an associated hierarchy of child elements. For example, a child element of a root element can be an input element that is included on the page that corresponds to the root element. Further, determining whether the selection data corresponds to the input element can include comparing the selection data with the input boundary. For example, for each child element, the SDK embedded in the mobile application can determine whether the coordinates of the selection data intersect the input boundary of the child element. The SDK can retrieve the input boundary of the child element and compare the location to determine whether the coordinates are within the input boundary.

At block 1130, the SDK embedded in the mobile application can determine an action associated with the input element when the selection data corresponds to the input element. For example, when the SDK embedded in the mobile application determines that the coordinates of the input event intersect the input boundary of a particular child element, the input element that corresponds to the child element becomes the target input element. The target input element can be the input element that corresponds to the input event detected at the terminal device. For example, if the agent viewing content 740 clicks on a location of content 740 that corresponds to an image of a text field, the target input element would be the input element that corresponds to the text field. The SDK can retrieve the defined action associated with the target input element. For example, each input element can have an associated action that is defined in the program code of the mobile application. The defined action can be based on the type of input element. For instance, an action for a radio button can be toggling selection of the radio button between unselected and selected, the action for a text element can be populating the text included in the input value that defines the text to be included in the text box, the action for a drop-down menu can be to display the items included in the drop down list, the action for a button can be the selection of that button, the action for a button representing a scroll arrow can be to scroll the screen, and so on. The action for a particular input element can be coded into the program code of the mobile application. The SDK embedded in the mobile application can retrieve the action associated with the target input element. At block 1135, the retrieved action for the target input element can be performed.

Figure 12:
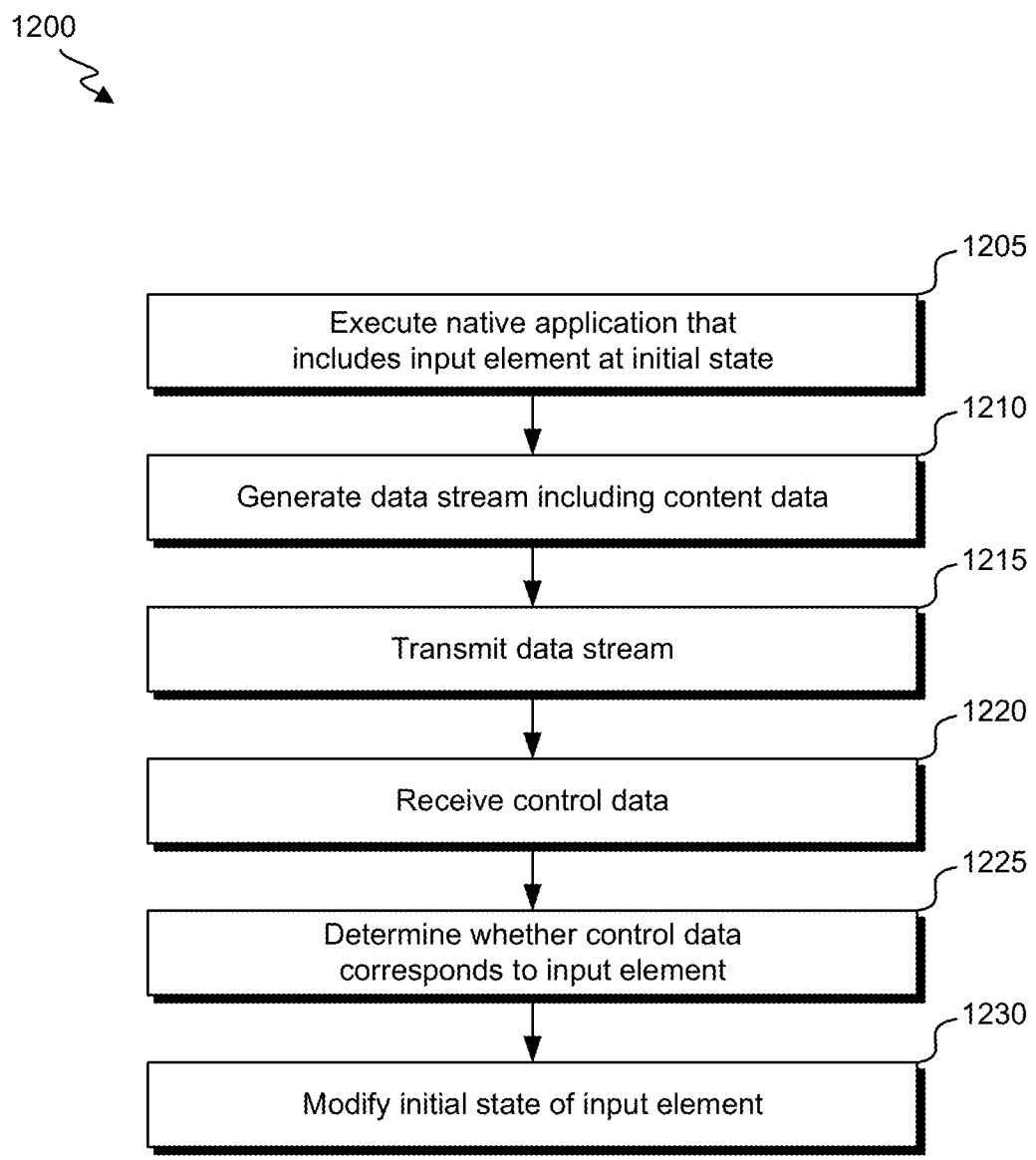
FIG. 12 shows a flowchart of another process for remotely controlling mobile applications.

FIG. 12 shows a flowchart of another process for remotely controlling mobile applications. Process 1200 can be performed by the network device. Further, process 1200 can be performed to enable a mobile application executing on a network device to be remotely controlled by a terminal device. Further, process 1200 can also establish a communication session between the network device and the terminal device, such that content presented by the mobile application on the network device can be shared in real-time with the terminal device, and such that the terminal device can remotely control the mobile application.

Process 1200 begins at block 1205 wherein the network device executes a mobile application. In some instances, the mobile application can include an input element at an initial state. The mobile application can include an embedded SDK that enables a terminal device to remotely control the mobile application in real-time. The mobile application can be executed when the network device receives an input corresponding to a selection of an icon displayed on the network device. For example, the initial state of the input element can be the state of the input element (e.g., selected, unselected, empty text field, and so on) when the mobile application is booted. The initial state can also be the most-recent state of the input element or any previous state of the input element. The communication session that allows the terminal device to receive the real-time content presented by the mobile application can be established after the mobile application has been executed (e.g., when the mobile application receives input corresponding to a selection of a button that initiates the communication session).

At block 1210, the SDK embedded in the mobile application can generate a data stream that includes the content (e.g., content data) presented by the mobile application. For example, the content data can be images, video frames, or screenshots of the page or pages presented by the mobile application on the network device. As another example, when the content data includes an image or screenshot, the image or screenshot can include an object presented by the mobile application. The object can be a portion of the image or screenshot that corresponds to an input element. For example, if the input element is a radio button, the object can correspond to the pixels of the screenshot that include the radio button. Further, generating the data stream can include applying the WebRTC protocol to the content data to generate a data stream that includes the content data in real-time. It will be appreciated that other real-time communication protocols can be used. Further, it will be appreciated that any transformations to the captured content data (e.g., a transformation of the size of the video frame).

At block 1215, the network device can transmit the data stream to the communication server during the communication session. The communication server can transmit or forward the received data stream to the terminal device. In some instances, the network device can include an identifier of the communication session into the data stream so that the communication server can determine which devices are communicating as part of the communication session. For example, the identifier can also identify which network device and which terminal device have joined the communication session. When the communication server receives the data stream, the communication server can extract the identifier and determine to which terminal device to transmit the data stream. Further, when the communication server receives the detected input events from the terminal device, the communication server can extract an identifier included or associated with the input event to determine which network device is to receive the input event. Further, when the data stream is received at the terminal device, the content data included in the data stream can be displayed at the terminal device. For example, the terminal device can display the video frames on the terminal device so that a real-time video of the content presented by the mobile application can be viewed by the agent operating the terminal device.

At block 1220, the network device can receive control data. For example, the control data can be associated with the object. The communication server can generate the control data when the communication server receives the event data associated the detected input event from the terminal device. In some instances, the control data can include an identifier of the communication session or identifiers of the network device and the terminal device (e.g., device identifiers). The control data can include the selection data associated with a selection at the terminal device. For example, a selection at the terminal device can be a detected click, tap or swipe, for example, performed at the terminal device. Further, the selection at the terminal device can be associated with the object because the selection can be at an object location corresponding to an input element (e.g., the portion of the screenshot, image, or video that corresponds to the input element).

At block 1225, the SDK embedded in the mobile application can determine whether the control data corresponds to the input element. For example, the SDK can identify the location of the input event from the coordinates included in the selection data extracted from the control data. Further, the SDK can identify a root element (e.g., a current page presented by the mobile application), and for each child element (e.g., input element presented on the current page), determine whether the coordinates of the selection are within the input boundary of the child element. If the coordinates are included within the input boundary, then that child element can be the target input element. If the coordinates are not included in an input boundary of any of the child elements, then the process can end.

At block 1230, when the SDK identifies the target input element, the SDK can modify the initial state of the input element. In some instances, modifying the initial state of the input element can include changing the initial state to a subsequent state. For example, modifying the initial state of a text field can include adding one or more characters received from the terminal device as the input value of the text field and populating the added characters in the text box. In this example, the input value of the text box can be the contents of the text box that were coded for the text field in the program code of the mobile application code. The input value can be updated based on the characters received from the terminal device to allow the terminal device to remotely control the contents of the text field presented by the mobile application. As another example, modifying the initial state of an unselected radio button can include toggling the radio button to a selected state. Further, in some instances, modifying the initial state of an input element can include performing processes 800 or 900 described above. For example, modifying the initial state of an input element can include replicating the input event at the location of the input element.

Specific details are given in the above description to provide a thorough understanding of the embodiments. However, it is understood that the embodiments can be practiced without these specific details. For example, circuits can be shown as block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that portions of the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium", "storage" or "memory" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A computer-implemented method comprising:
   establishing a communication session between a network device and a terminal device, wherein the communication session is associated with a communication server;
   facilitating communication between the network device and the terminal device, wherein the communication includes a data stream that includes content on display at the network device as successively captured over a period of time;
   detecting a set of one or more input events associated with an interface of the terminal device during the communication session, wherein the interface corresponds to the data stream, and wherein the set of the detected input events corresponds to a plurality of different types of the input events;
   filtering the set of the one or more input events based on a predetermined type of the input events to obtain a subset of the one or more detected input events that correspond to the predetermined type, wherein an amount of data associated with the set of the detected input events is filtered to a reduced amount of data associated with the subset of the one or more detected input events that correspond to the predetermined type; and
   transmitting data regarding replication of the subset of the one or more detected input events, wherein when the data is received at the network device, the network device replicates the subset of the one or more detected input events in accordance with the received data.

2. The method of claim 1, wherein the content in the data stream includes a plurality of screenshots of the display of the network device.

3. The method of claim 1, wherein when the terminal device receives the data stream, a display of the terminal device is modified in accordance with the content on display at the network device.

4. The method of claim 1, wherein the content in the data stream includes audio captured at a microphone of the network device.

5. The method of claim 4, wherein when the terminal device receives the data stream, the terminal device converts data regarding the audio into sound and outputs the sound using a speaker at the terminal device.

6. The method of claim 1, wherein the communication session is associated with one or more identifiers, and wherein the data stream includes the one or more identifiers.

7. The method of claim 6, wherein facilitating the communication further comprises:

extracting the identifiers from a communication associated with the network device or the terminal device; and
   forwarding the communication to the network device or the terminal device based on the identifiers.

8. The method of claim 6, wherein when the communication server receives the data stream, the communication server transmits the data stream to the terminal device based on the identifiers.

9. The method of claim 7, wherein the data regarding the replication of the subset of the one or more detected input events includes the identifiers, and wherein when the communication server receives the data regarding the replication of the subset of the one or more detected input events, the communication server transmits the data regarding the replication of the subset of the one or more detected input events to the terminal device based on the identifiers.

10. The method of claim 1, wherein the data regarding replication of the subset of the one or more detected input events includes metadata associated with processing the input events in the subset.

11. The method of claim 1, wherein facilitating the communication between the network device and the terminal device includes preventing one or more types of elements in the display of the network device from being captured.

12. The method of claim 1, wherein the terminal device replicates the subset of the one or more detected input events by modifying an initial state of an input element to a different state.

13. A system comprising:
    a communication interface that:
       establishes a communication session between a network device and a terminal device; and
       facilitates communication between the network device and the terminal device, wherein the communication includes a data stream that includes content on display at the network device as successively captured over a period of time; and
    a processor that executes instructions stored in memory, wherein the processor executes the instructions to:
       detect a set of one or more input events associated with an interface of the terminal device during the communication session, wherein the interface corresponds to the data stream, and wherein the set of the detected input events corresponds to a plurality of different types of the input events; and
       filter the set of the one or more input events based on a predetermined type of the input events to obtain a subset of the one or more detected input events that correspond to the predetermined type, wherein an amount of data associated with the set of the detected input events is filtered to a reduced amount of data associated with the subset of the one or more detected input events that correspond to the predetermined type;
    wherein the communication interface transmits data regarding replication of the subset of the one or more detected input events, wherein when the data is received at the network device, the network device replicates the subset of the one or more detected input events in accordance with the received data.

14. The system of claim 13, wherein the content in the data stream includes a plurality of screenshots of the display of the network device.

15. The system of claim 13, wherein when the terminal device receives the data stream, a display of the terminal device is modified in accordance with the content on display at the network device.

16. The system of claim 13, wherein the content in the data stream includes audio captured at a microphone of the network device.

17. The system of claim 16, wherein when the terminal device receives the data stream, the terminal device converts data regarding the audio into sound and outputs the sound using a speaker at the terminal device.

18. The system of claim 13, wherein the communication session is associated with one or more identifiers, and wherein the data stream includes the one or more identifiers.

19. The system of claim 18, wherein the processor executes further instructions to extract the identifiers from a communication associated with the network device or the terminal device, and wherein the communication interface further forwards the communication to the network device or the terminal device based on the identifiers.

20. The system of claim 18, wherein when the communication interface receives the data stream, the communication interface transmits the data stream to the terminal device based on the identifiers.

21. The system of claim 19, wherein the data regarding the replication of subset of the one or more detected input events includes the identifiers, and wherein when the communication interface receives the data regarding the replication of the subset of the one or more detected input events, the communication interface transmits the data regarding the replication of the subset of the one or more detected input events to the terminal device based on the identifiers.

22. The system of claim 13, wherein the data regarding replication of the subset of the one or more detected input events includes metadata associated with processing the input events in the subset.

23. The system of claim 13, wherein the communication interface facilitates the communication between the network device and the terminal device by preventing one or more types of elements in the display of the network device from being captured.

24. The system of claim 13, wherein the terminal device replicates the subset of the one or more detected input events by modifying an initial state of an input element to a different state.

25. A non-transitory computer-readable storage medium, having embodied thereon a program executable by a processor to perform a method comprising:
establishing a communication session between a network device and a terminal device, wherein the communication session is associated with a communication server;
facilitating communication between the network device and the terminal device, wherein the communication includes a data stream that includes content on display at the network device as successively captured over a period of time;
detecting a set of one or more input events associated with an interface of the terminal device during the communication session, wherein the interface corresponds to the data stream, and wherein the set of the detected input events corresponds to a plurality of different types of the input events;
filtering the set of the one or more detected input events based on a predetermined type of the input events to obtain a subset of the one or more detected input events that correspond to the predetermined type, wherein an amount of data associated with the set of the detected input events is filtered to a reduced amount of data associated with the subset of the one or more detected input events that correspond to the predetermined type; and
transmitting data regarding replication of the subset of the one or more detected input events, wherein when the data is received at the network device, the network device replicates the subset of the one or more detected input events in accordance with the received data.

26. The non-transitory computer-readable storage medium of claim 25, wherein the content in the data stream includes a plurality of screenshots of the display of the network device.

27. The non-transitory computer-readable storage medium of claim 25, wherein when the terminal device receives the data stream, a display of the terminal device is modified in accordance with the content on display at the network device.

28. The non-transitory computer-readable storage medium of claim 25, wherein the content in the data stream includes audio captured at a microphone of the network device.

29. The non-transitory computer-readable storage medium of claim 28, wherein when the terminal device receives the data stream, the terminal device converts data regarding the audio into sound and outputs the sound using a speaker at the terminal device.

30. The non-transitory computer-readable storage medium of claim 25, wherein the communication session is associated with one or more identifiers, and wherein the data stream includes the one or more identifiers.

31. The non-transitory computer-readable storage medium of claim 30, wherein facilitating the communication further comprises:
extracting the identifiers from a communication associated with the network device or the terminal device; and
forwarding the communication to the network device or the terminal device based on the identifiers.

32. The non-transitory computer-readable storage medium of claim 30, wherein when the communication server receives the data stream, the communication server transmits the data stream to the terminal device based on the identifiers.

33. The non-transitory computer-readable storage medium of claim 31, wherein the data regarding the replication of the subset of the one or more detected input events includes the identifiers, and wherein when the communication server receives the data regarding the replication of the subset of the one or more detected input events, the communication server transmits the data regarding the replication of the subset of the one or more detected input events to the terminal device based on the identifiers.

34. The non-transitory computer-readable storage medium of claim 25, wherein the data regarding replication of the subset of the one or more detected input events includes metadata associated with processing the input events in the subset.

35. The non-transitory computer-readable storage medium of claim 25, wherein facilitating the communication between the network device and the terminal device includes preventing one or more types of elements in the display of the network device from being captured.

36. The non-transitory computer-readable storage medium of claim 25, wherein the terminal device replicates the subset of the one or more detected input events by modifying an initial state of an input element to a different state.

\* \* \* \* \*